US012784149B2

(12) United States Patent
Park et al.

(10) Patent No.: US 12,784,149 B2
(45) Date of Patent: Nov. 3, 2026

(54) METHOD, ELECTRONIC DEVICE, AND STORAGE MEDIUM FOR PROCESSING IMAGE BY USING CONVOLUTION NEURAL NETWORK

(71) Applicant: SAMSUNG ELECTRONICS CO., LTD., Suwon-si (KR)

(72) Inventors: Yongsup Park, Suwon-si (KR); Sangwook Baek, Suwon-si (KR); Sangmi Lee, Suwon-si (KR); Youjin Lee, Suwon-si (KR); Taeyoung Jang, Suwon-si (KR); Gyehyun Kim, Suwon-si (KR); Beomseok Kim, Suwon-si (KR); Youngo Park, Suwon-si (KR); Kwangpyo Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 170 days.

(21) Appl. No.: 18/929,191

(22) Filed: Oct. 28, 2024

(65) Prior Publication Data

US 2025/0054111 A1 Feb. 13, 2025

Related U.S. Application Data

(63) Continuation of application No. PCT/KR2023/004681, filed on Apr. 6, 2023.

(30) Foreign Application Priority Data

Apr. 28, 2022 (KR) ........................ 10-2022-0052894
Oct. 12, 2022 (KR) ........................ 10-2022-0130916

(51) Int. Cl.

*G06T 5/60* (2024.01)
*G06T 3/4046* (2024.01)

(52) U.S. Cl.

CPC .............. *G06T 5/60* (2024.01); *G06T 3/4046* (2013.01); *G06T 2207/10024* (2013.01); *G06T 2207/20081* (2013.01); *G06T 2207/20084* (2013.01)

(58) Field of Classification Search

CPC ................................ G06T 5/60; G06T 3/4046
See application file for complete search history.

(56) References Cited

U.S. PATENT DOCUMENTS 8,374,433 B2 2/2013 Simson et al.
9,332,239 B2 5/2016 Cote et al.
(Continued)

FOREIGN PATENT DOCUMENTS

KR 10-1373334 B1 3/2014
KR 10-2020-0040186 A 4/2020
(Continued)

OTHER PUBLICATIONS

J. Kim et al., "Accurate Image Super-Resolution Using Very Deep Convolutional Networks," in 2016 IEEE Conference on Computer Vision and Pattern Recognition (CVPR), arXiv:1511.04587v2 [cs. CV], Nov. 11, 2016, 9 pages, doi: 10.1109/CVPR.2016.182.
(Continued)

*Primary Examiner* — Dave Czekaj
(74) *Attorney, Agent, or Firm* — Sughrue Mion, PLLC

(57) ABSTRACT

Provided is an image processing method including upscaling an input image to generate an upscaled image, obtaining a first feature map and a second feature map by inputting the upscaled image to a convolutional neural network and performing a convolution operation on the upscaled image with one or more kernels included in the convolutional neural network, obtaining a gain map by inputting the first feature map to a first convolutional layer, obtaining an offset map by inputting the second feature map to a second
(Continued)

convolutional layer, and generating an output image, based on the upscaled image, the gain map, and the offset map, wherein the convolutional neural network is configured to be trained to reduce a difference between a hue of the input image and a hue of the output image.

20 Claims, 11 Drawing Sheets

(56) References Cited

U.S. PATENT DOCUMENTS

| | | | | |
|---|---|---|---|---|
| 9,911,399 | B2 | 3/2018 | Baek et al. | |
| 10,304,009 | B1 | 5/2019 | Kim et al. | |
| 10,380,753 | B1 | 8/2019 | Csordás et al. | |
| 10,659,790 | B2 | 5/2020 | Lu et al. | |
| 11,024,009 | B2 | 6/2021 | Shi et al. | |
| 11,694,306 | B2 | 7/2023 | Baek et al. | |
| 11,727,533 | B2 | 8/2023 | Yoo et al. | |
| 2015/0235345 | A1 | 8/2015 | Liu | |
| 2021/0360179 | A1* | 11/2021 | Dangi | G06N 3/045 |
| 2022/0036523 | A1* | 2/2022 | Moran | G06T 1/20 |
| 2022/0092106 | A1 | 3/2022 | Chang et al. | |
| 2022/0138904 | A1 | 5/2022 | Kim et al. | |
| 2022/0147041 | A1* | 5/2022 | Iagnemma | B60W 30/143 |
| 2023/0377204 | A1* | 11/2023 | Guede | G06T 9/001 |

FOREIGN PATENT DOCUMENTS

| | | | |
|---|---|---|---|
| KR | 10-2020-0116767 | A | 10/2020 |
| KR | 10-2021-0016587 | A | 2/2021 |
| KR | 10-2021-0019835 | A | 2/2021 |
| KR | 10-2303666 | B1 | 9/2021 |
| KR | 10-2312338 | B1 | 10/2021 |
| KR | 10-2021-0154684 | A | 12/2021 |

OTHER PUBLICATIONS

Xintao Wang et al., "EESRGAN Enhanced super-resolution generative adversarial networks," In Computer Vision—ECCV 2018 Workshops, arXiv:1809.00219v2 [cs.CV], Sep. 17, 2018, 23 pages, https://doi.org/10.1007/978-3-030-11021-5_5.

Kohei Inoue et al., "Hue-Preserving Saturation Improvement in RGB Color Cube," Journal of Imaging, Aug. 18, 2021, vol. 7, No. 8, pp. 1-19, https://doi.org/10.3390/jimaging7080150.

International Search Report (PCT/ISA/210) issued by the International Searching Authority on Jul. 11, 2023 in corresponding International Application No. PCT/KR2023/004681.

Written Opinion (PCT/ISA/237) issued by the International Searching Authority on Jul. 11, 2023 in corresponding International Application No. PCT/KR2023/004681.

* cited by examiner

METHOD, ELECTRONIC DEVICE, AND STORAGE MEDIUM FOR PROCESSING IMAGE BY USING CONVOLUTION NEURAL NETWORK

CROSS-REFERENCE TO RELATED APPLICATIONS

This application is a bypass continuation of International Application No. PCT/KR2023/004681, filed on Apr. 6, 2023, which is based on and claims priority to Korean Patent Application No. 10-2022-0052894, filed on Apr. 28, 2022 and Korean Patent Application No. 10-2022-0130916, filed on Oct. 12, 2022, in the Korean Intellectual Property Office, the disclosures of which are incorporated by reference herein in their entireties.

BACKGROUND

1. Field

Embodiments of the present disclosure relate to an image processing method and electronic device, for reducing a hue difference between an input image and an output image by using a convolutional neural network (CNN).

2. Description of Related Art

With the development of computer technology, artificial intelligence has become an important trend leading future innovation. Because artificial intelligence imitates human thinking, it may be applied virtually limitlessly to all industries. Representative technologies of artificial intelligence include pattern recognition, machine learning, expert systems, neural networks, and natural language processing.

A neural network models the characteristics of human biological nerve cells using mathematical expressions and uses an algorithm that imitates the learning ability of humans. Through this algorithm, the neural network may create mapping between input data and output data, and the ability to create the mapping may be expressed as the learning ability of the neural network. Additionally, the neural network has a generalization ability to generate correct output data for input data that has not been used, based on learned results.

When images are scaled using a deep neural network (e.g., a deep convolutional neural network (CNN)), output images are generated without considering changes in hue. In other words, since scaling is performed independently for each hue channel of an image, there is a problem in that hue distortion occurs.

SUMMARY

One or more embodiments provided an image processing method and electronic device, for reducing a hue difference between an input image and an output image by using a convolutional neural network.

According an aspect of one or more embodiments, there is provided an image processing method including upscaling an input image to generate an upscaled image, obtaining a first feature map and a second feature map by inputting the upscaled image to a convolutional neural network and performing a convolution operation on the upscaled image with one or more kernels included in the convolutional neural network, obtaining a gain map by inputting the first feature map to a first convolutional layer, obtaining an offset map by inputting the second feature map to a second convolutional layer, and generating an output image, based on the upscaled image, the gain map, and the offset map, wherein the convolutional neural network is configured to be trained to reduce a difference between a hue of the input image and a hue of the output image.

The generating of the output image, based on the upscaled image, the gain map, and the offset map, may include obtaining an intermediate map by performing element-wise multiplication based on a plurality of hue channels of the upscaled image, the gain map, and a normalization constant, and generating the output image by performing element-wise addition on the plurality of hue channels of the upscaled image and on the intermediate map.

At least one of the convolutional neural network, the first convolutional layer, or the second convolutional layer may be configured to be trained based non a training data set including input images and output images corresponding to the input images, and the output images may be images obtained by correcting a hue of the upscaled image to reduce a hue distortion of the input images.

The training may be performed based on training loss, and the training loss may include at least one of L1 loss or SSIM loss.

The input image and the output image may be gray-scale images.

The input image and the output image may have a red-green-blue (RGB) color space or a YCoCg color space.

Two or more hue channels among a plurality of hue channels of the input image may have the same value, and two or more hue channels among a plurality of hue channels of the output image, corresponding to the two or more hue channels of the input image having the same value, may have the same value.

The method may further include obtaining an image having a YCoCg color space by performing color space conversion on an image having a RGB color space, and obtaining an image having a RGB color space by performing color space conversion on the generated output image, wherein the input image may be an image having the obtained YCoCg color space, and the output image may be an image having a YCoCg color space.

The generating of the output image by performing the element-wise addition may include generating, based on the input image and the output image being images each having a RGB color space, the output image by performing element-wise addition on the plurality of hue channels of the upscaled image, the intermediate map, and the offset map, or generating, based on the input image and the output image being images each having a YCoCg color space, the output image by performing element-wise addition on a Y channel of the upscaled image, the intermediate map, and the offset map.

The method may further include obtaining a user input for displaying an image having a resolution set by the user, wherein the generating of the upscaled image further includes upscaling the input image to have the resolution set by the user, and the resolution set by the user is greater than or equal to an HD+ resolution.

According to another aspect of one or more embodiments, there is provided an electronic device configured to process an image including a memory configured to store one or more instructions, and at least one processor configured to execute the one or more instructions stored in the memory to generate an upscaled image by upscaling an input image, obtain a first feature map and a second feature map by inputting the upscaled image to a convolutional neural network and performing a convolution operation on the upscaled image with one or more kernel included in the convolutional neural network, obtain a gain map by inputting the first feature map to a first convolutional layer, obtain an offset map by inputting the second feature map to a second convolutional layer, and generate an output image, based on the upscaled image, the gain map, and the offset map, wherein the convolutional neural network is configured to be trained to reduce a difference between a hue of the input image and a hue of the output image.

The at least one processor may be further configured to execute the one or more instructions to obtain an intermediate map by performing element-wise multiplication, based on a plurality of hue channels of the upscaled image, the gain map, and a normalization constant, and generate the output image by performing element-wise addition on the plurality of hue channels of the upscaled image and the intermediate map.

At least one of the convolutional neural network, the first convolutional layer, and the second convolutional layer may be configured to be trained based on a training data set including input images, output images corresponding to the input images, and the output images may be images obtained by correcting a hue of the upscaled image to reduce a hue distortion from the input images.

The training may be performed based on training loss, and the training loss may include at least one of L1 loss or SSIM loss.

According to still another aspect of one or more embodiments, there is provided a non-transitory computer-readable recording medium storing a program for executing a method on a computer, the method including upscaling an input image to generate an upscaled image, obtaining a first feature map and a second feature map by inputting the upscaled image to a convolutional neural network and performing a convolution operation on the upscaled image with one or more kernels included in the convolutional neural network, obtaining a gain map by inputting the first feature map to a first convolutional layer, obtaining an offset map by inputting the second feature map to a second convolutional layer, and generating an output image, based on the upscaled image, the gain map, and the offset map, wherein the convolutional neural network is configured to be trained to reduce a difference between a hue of the input image and a hue of the output image.

The generating of the output image, based on the upscaled image, the gain map, and the offset map, may include obtaining an intermediate map by performing element-wise multiplication based on a plurality of hue channels of the upscaled image, the gain map, and a normalization constant, and generating the output image by performing element-wise addition on the plurality of hue channels of the upscaled image and on the intermediate map.

At least one of the convolutional neural network, the first convolutional layer, or the second convolutional layer may be configured to be trained based non a training data set including input images and output images corresponding to the input images, and the output images may be images obtained by correcting a hue of the upscaled image to reduce a hue distortion of the input images.

The training may be performed based on training loss, and the training loss may include at least one of L1 loss or SSIM loss.

The input image and the output image may be gray-scale images.

The input image and the output image may have a red-green-blue (RGB) color space or a YCoCg color space.

BRIEF DESCRIPTION OF DRAWINGS

Embodiments will be more clearly understood from the following detailed description taken in conjunction with the accompanying drawings in which.

DETAILED DESCRIPTION

Figure 1:
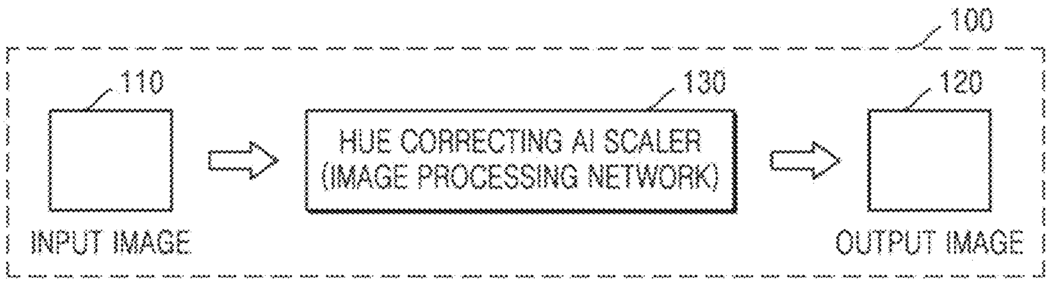
FIG. 1 shows an operation of processing an image by using an image processing network in an electronic device for processing an image, according to one or more embodiments.

Advantages and features of the present disclosure and a method of achieving the advantages and features will be apparent by referring to embodiments described below in connection with the accompanying drawings. However, the present disclosure is not restricted by the embodiments provided below but may be implemented in many different forms, and the present embodiments are provided to allow those having ordinary skill in the technical art to which the present disclosure belongs to understand the scope of the disclosure. The present disclosure is defined only by the scope of claims and their equivalents.

Although general terms being currently widely used were selected as terminology used in the present disclosure while considering the functions of the present disclosure, they may vary according to intentions of one of ordinary skill in the art, judicial precedents, the advent of new technologies, and the like. Terms arbitrarily selected may also be used in a specific case. In this case, their meanings will be described in detail in the detailed description of the disclosure. Hence, the terms used in the present disclosure must be defined based on the meanings of the terms and the entire contents of the present disclosure, not by simply stating the terms themselves.

The terms used in the present disclosure are merely used to describe particular embodiments, and are not intended to limit the present disclosure. The singular forms "a," "an,"

and "the" include plural referents unless the context clearly dictates otherwise. All terms, including technical and scientific terms, used herein have the same meaning as commonly understood by one of ordinary skill in the technical art described in the present disclosure. Also, although the terms "first", "second", etc. may be used herein to describe various components, these components should not be limited by these terms. These terms are only used to distinguish one component from another.

The term "said" and the similar terms used in the present specification, specifically, in the claims may indicate both single and plural. Also, if the order of operations for describing a method according to the present disclosure is not definitely specified, the operations may be performed in appropriate order. However, the present disclosure is not limited to the order in which the operations are described.

The phrases "in some embodiments" or "according to one or more embodiments" appearing in the present specification do not necessarily indicate the same embodiment.

Some embodiments of the present disclosure may be represented by functional block configurations and various processing operations. Some or all of these functional blocks may be implemented with various numbers of hardware and/or software components that perform particular functions. For example, the functional blocks of the present disclosure may be implemented by one or more microprocessors or circuit configurations for a given function. Also, for example, the functional blocks of the present disclosure may be implemented in various programming or scripting languages. The functional blocks may be implemented with algorithms running on one or more processors. The present disclosure may also employ typical methods for electronic environment settings, signal processing, and/or data processing. The terms "mechanism", "element", "means", and "configuration" may be broadly used, and are not limited to mechanical and physical configurations.

Also, connection lines or connection members between components shown in the drawings are examples of functional connections and/or physical or circuital connections. In an actual apparatus, the connections between the components may be implemented in the form of various functional connections, physical connections, or circuital connections that may be replaced or added.

In the entire specification, when a certain part "includes" a certain component, the part does not exclude another component but may further include another component, unless the context clearly dictates otherwise. As used herein, the terms "portion", "module", or "unit" refers to a software or hardware component such as a Field Programmable Gate Array (FPGA) or an Application Specific Integrated Circuit (ASIC) to perform certain functions. However, the term "portion", "module" or "unit" is not limited to software or hardware. The "portion", "module", or "unit" may be configured in an addressable storage medium, or may be configured to run on at least one processor. Therefore, as an example, the "portion", "module", or "unit" includes components, such as software components, object-oriented software components, class components, and task components, processors, functions, attributes, procedures, sub-routines, segments of program codes, drivers, firmware, microcodes, circuits, data, databases, data structures, tables, arrays, and variables. Functions provided in the components and "portions", "modules" or "units" may be combined into a smaller number of components and "portions", "modules" and "units", or sub-divided into additional components and "portions", "modules" or "units".

Hereinafter, embodiments of the present disclosure will be described in detail with reference to the accompanying drawings so that the present disclosure may be readily implemented by one of ordinary skill in the technical field to which the present disclosure pertains. Also, in the drawings, parts irrelevant to the description will be omitted for the simplicity of explanation.

In the present specification, "hue" may be a hue in a HSV color space where a color is expressed by using coordinates of hue, saturation, and value.

In the present specification, "hue correction" may be an operation for reducing, in a process of processing an arbitrary image to generate an output image, a hue difference between a hue of the arbitrary image and a hue of the output image. Also, a hue correcting Artificial Intelligence (AI) scaler may be an image processing network including a structure for hue correction.

In the present specification, a "feature map" may be a result obtained by inputting an arbitrary image to a convolutional neural network and performing a convolution operation on the arbitrary image with one or more kernels. For example, a first feature map may be a part of an output obtained by inputting an upscaled image to a convolutional neural network and performing a convolution operation with one or more kernels, and a second feature map may be a remaining part excluding the first feature map from an output obtained by inputting the upscaled image to the convolutional neural network and performing a convolution operation with one or more kernels. The one or more kernels used to output the first feature map may be different from the one or more kernels used to output the second feature map.

In the present specification, a "gain map" may be a result obtained by performing a convolution operation on the first feature map with one or more kernels of a first convolutional layer. Also, the gain map may perform element-wise multiplication by an arbitrary map.

In the present specification, an "offset map" may be a result obtained by performing a convolution operation on the second feature map with one or more kernels of a second convolutional layer. Also, the offset map may perform element-wise addition with an arbitrary map.

In the present specification, an "intermediate map" may be a result obtained by performing element-wise multiplication of a gain map by an arbitrary map. Also, the intermediate map may be a map generated in an operation process that is performed to generate an output image. The intermediate map may be a result obtained by performing element-wise multiplication of a gain map by a plurality of individual hue channels of an upscaled image, or a value obtained by performing element-wise multiplication of a gain map by a plurality of individual hue channels of an upscaled image and dividing each element by a normalization constant.

FIG. 1 shows an operation of processing an image using an image processing network in an electronic device for processing an image, according to one or more embodiments. In one or more embodiments, an electronic device 100 (hereinafter, also referred to as an electronic device) which processes images may process an image by using an image processing network. The image processing network may be a hue correcting artificial intelligence (AI) scaler.

In one or more embodiments, an image processing network 130 may generate an output image 120 by receiving an input image 110 and processing the input image 110. Herein, the input image may be an image having a RGB color space or an image having a YCoCg color space. The electronic device 100 may upscale the input image 110 by using the image processing network 130 to generate an upscaled image. Also, the electronic device 100 may change a value and saturation of each pixel of the upscaled image, and set a degree of change of the value and/or saturation of the pixel by using AI. The image processing network 130 may process the input image 110 or the upscaled image to obtain or generate the output image 120 of which a hue has been corrected to reduce a hue difference from a hue of the input image or a hue of the upscaled image. In the present specification, for convenience of description, an upscaled image is described as an example of a scaled image. However, a scaled image is not limited to an upscaled image.

According to one or more embodiments, image processing that is performed by the image processing network 130 will be described in detail with reference to the following drawings.

According to one or more embodiments, an output image of which a hue difference from an input image has been reduced may be obtained or generated without using a plurality of samples or a complex neural network.

Figure 2:
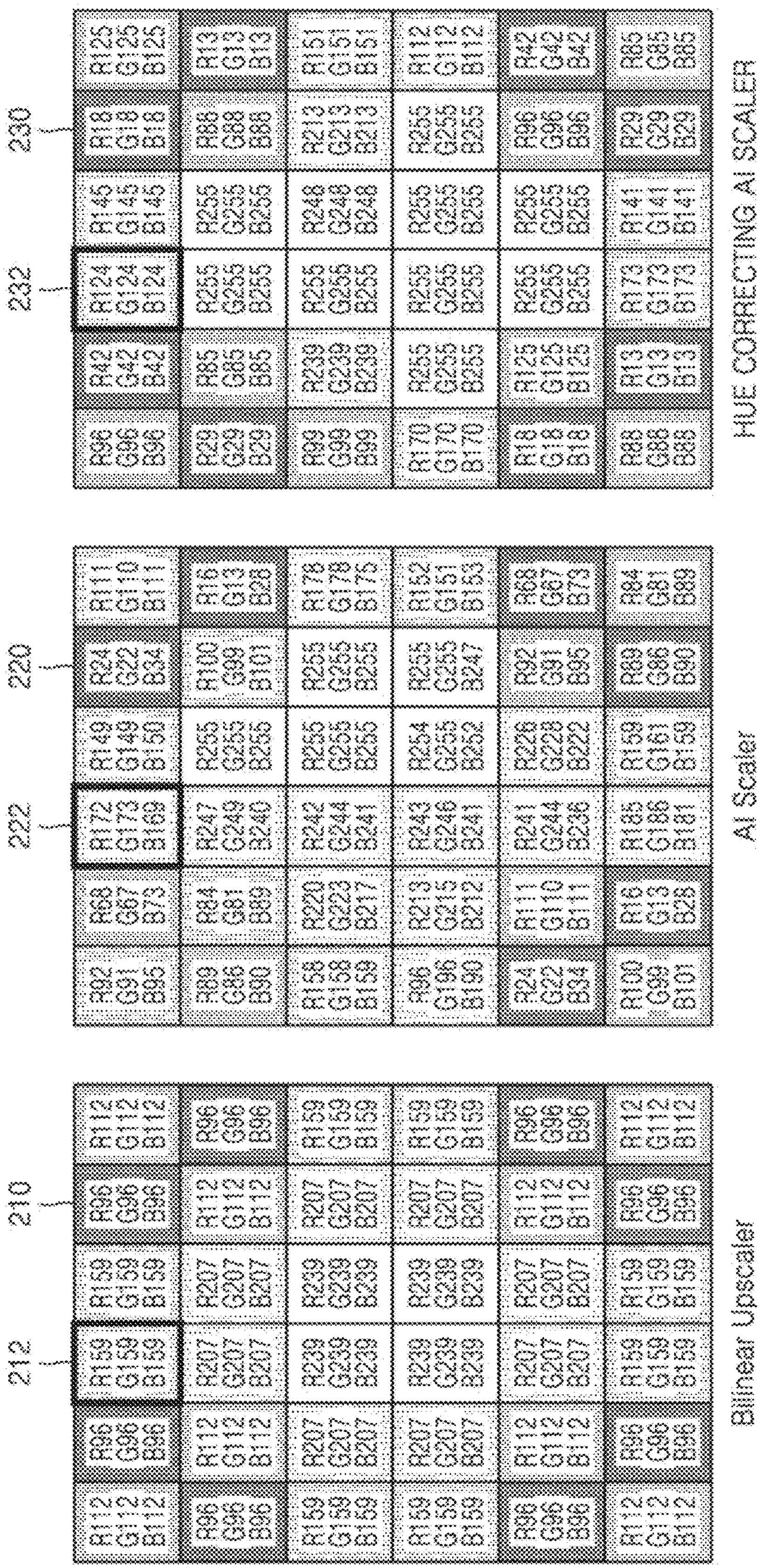
FIG. 2 shows results of scaling of a gray-scale image through an artificial intelligence (AI) scaler and a hue correcting AI scaler, according to one or more embodiments.

FIG. 2 shows results of scaling on a gray-scale image through an AI scaler and a hue correcting AI scaler, according to one or more embodiments.

In one or more embodiments, a gray-scale image may be an image having a RGB color space, wherein all of a Red (R) channel, a Green (G) channel, and a Blue (B) channel as hue channels of the image have the same value.

Hereinafter, an input image may be a gray-scale image. An output image obtained by inputting an input image to an AI upscaler will be described. Also, an output image obtained or generated by inputting a gray-scale image to a hue correcting AI scaler according to one or more embodiments may be compared with an output image generated by the AI upscaler.

In one or more embodiments, the AI upscaler may obtain a gray-scale image as an input image. The electronic device 100 may perform upscaling through Nearest neighbor or a Bilinear upscaler and then input an upscaled image 210 to a convolutional neural network to generate an AI upscaled image 220 as an output image. Anan upscaler for performing upscaling is not limited to the above-mentioned up-scaler.

In one or more embodiments, because the upscaled image 210 obtained by inputting the gray-scale image as an input image has been upscaled in such a way as to increase the size by using surrounding pixels in the electronic device 100, hue channels of the RGB color space may have the same value. For example, all of a R channel, a G channel, and a B channel of a pixel 212 in the upscaled image 210 may have a value of 159.

In one or more embodiments, in regard to the AI upscaled image 220 generated by using the existing AI upscaler, a hue of each pixel in individual situations may be reflected in detail to the AI upscaled image 220 through an algorithm and convolutional neural network (CNN) learning. However, in the AI upscaled image 220 which is an output image obtained by inputting the upscaled image 210 as a gray-scale image to the convolutional neural network, a hue has been processed independently for each hue channel. Accordingly, a hue of the input image or the upscaled image 210 may be distorted in the AI upscaled image 220. For example, R, G, and B channels as individual hue channels of the RGB color space of the AI upscaled image 220 may have different values. For example, all of the R channel, G channel, and B channel of the pixel 212 in the upscaled image 210 may have a value of 159. For example, all of the R, G, and B channels may have the same value. However, a pixel 222 in the AI upscaled image 220 may have a R channel value of 172, a G channel value of 173, and a B channel value of 169. For example, although the input image or the upscaled image 210 is a gray-scale image, the AI upscaled image 220 may be output as a non-gray-scale image.

In one or more embodiments, the hue correcting AI scaler may receive a gray-scale image. The hue correcting AI scaler may include Nearest neighbor or a Bilinear upscaler. The electronic device 100 may perform upscaling through the Nearest neighbor or Bilinear upscaler to generate an upscaled image 210. Also, hue correction may be formed on the upscaled image 210 to generate an output image. The output image may be referred to as a hue-corrected AI upscaled image 230. A hue difference between the hue-corrected AI upscaled image 230 and the upscaled image 210 may be less than a hue difference between the AI upscaled image 220 and the upscaled image 210.

In one or more embodiments, in regard to the hue-corrected AI upscaled image 230 generated by using the hue correcting AI upscaler, a hue of each pixel in individual situations may be reflected in detail to the hue-corrected AI upscaled image 230 through an algorithm and CNN learning, similar to the AI upscaled image 220. However, when a gray-scale image is input as an input image, the hue corrected AI upscaled image 230 as a gray-scale image may be generated as an output image. For example, all of hue channels of a RGB color space of the generated, hue-corrected AI upscaled image 230 may have the same value. For example, all of an R channel, a B channel, and a B channel of a pixel 232 in the hue-corrected AI upscaled image 230 may have a value of 124. Thee above example relates to an image having a RGB color space. However, embodiments are not limited thereto, and for example, the above example may also be applied in the same way to a YCoCg image.

In one or more embodiments, by using the hue correcting AI scaler, a distortion of a hue of an output image from a hue of an input image may be reduced or minimized, and an output image with constant hue quality may be generated.

Figure 3:
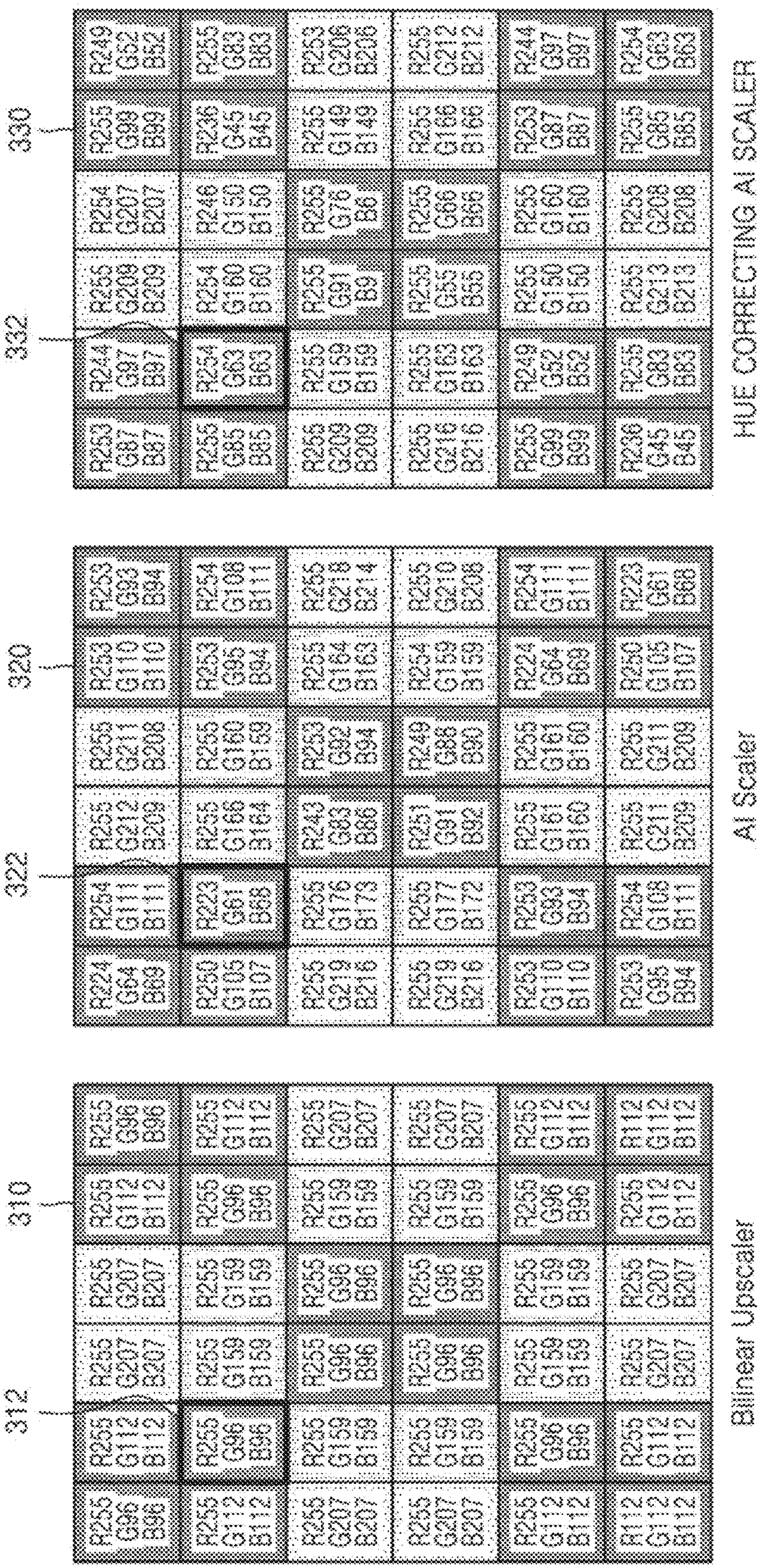
FIG. 3 shows results of scaling of an image having a red-green-blue (RGB) color space through an AI scaler and a hue correcting AI scaler, according to one or more embodiments.

FIG. 3 shows results of scaling on an image having a RGB color space through individual AI scalers, according to one or more embodiments.

In one or more embodiments, in regard to an image (hereinafter, referred to as a RGB image) having a RGB color space, two hue channels of R, G, and B channels as hue channels of the RGB image may have the same value.

In one or more embodiments, an input image may be a RGB image (hereinafter, referred to as a RGB image with the same two hue channels) of which two hue channels of hue channels have the same value. For example, an R channel and a G channel may have the same value, and a B channel may have another value. According to one or more other embodiments, an R channel and a B channel may have the same value, and a G channel may have another value. According to one or more other embodiments, a B channel and a G channel may have the same value, and an R channel may have another value different from the values of the B channel and G channel.

Hereinafter, an output image obtained by inputting a RGB image with the same two hue channels as an input image to the existing AI upscaler will be described. Also, an output image obtained or generated by inputting a RGB image with the same two hue channels as an input image to the hue correcting AI scaler may be compared with an output image generated by the existing AI upscaler.

In one or more embodiments, the existing AI upscaler may receive a RGB image with the same two hue channels as an input image. After upscaling is performed through the Nearest neighbor or Bilinear upscaler, an upscaled image 310 may be input to a convolutional neural network and thus, an AI upscaled image 320 may be generated as an output image. An upscaler for performing upscaling is not limited to the above-mentioned upscaler.

In one or more embodiments, because the upscaled image 310 obtained by inputting the RGB image with the same two hue channels as an input image has been upscaled in such a way as to increase the size by using surrounding pixels, the two hue channels having the same value in the input image may also have the same value in the upscaled image 310. For example, G and B channels of a pixel 312 in the upscaled image 310 may have the same value of 96, and an R channel of the pixel 312 may have another value of 255 that is different from that of the other channels.

In one or more embodiments, in regard to the AI upscaled image 320 generated by using the existing AI upscaler, a hue of each pixel in individual situations may be reflected in detail to the AI upscaled image 320 through an algorithm and CNN learning. When a RGB image with the same two hue channels is input as an input image to a general AI upscaler, the two hue channels identified as having the same value may have different values in the AI upscaled image 320. For example, the G and B channels of the pixel 312 in the upscaled image 310 may have the same value of 96, and the R channel may have another value of 255 that is different from that of the G and B channels. However, an R channel of a pixel 322 in the AI upscaled image 320, located at a position corresponding to the pixel 312 in the upscaled image 310 may have a value of 223, a G channel of the pixel 322 may have a value of 61, and a B channel of the pixel 322 may have a value of 68. For example, although the G and B channels of the upscaled image 310 which is a RGB image with the same two hue channels have the same value, the G and B channels of the AI upscaled image 320 may have different values. For example, it may be confirmed that the AI upscaled image 320 is output in a state of having a hue distorted from the input image.

In one or more embodiments, the hue correcting AI scaler may receive a RGB image with the same two hue channels as an input image. The hue correcting AI scaler may include Nearest neighbor or a Bilinear upscaler. By performing upscaling through the Nearest neighbor or Bilinear upscaler, an output image may be generated. The generated output image may be referred to as a hue-corrected AI upscaled image 330, and a hue difference between the hue-corrected AI upscaled image 330 and the upscaled image 310 may be less than a hue difference between the AI upscaled image 320 and the upscaled image 310. In one or more embodiments, in regard to the hue-corrected AI upscaled image 330 generated by using the hue correcting AI upscaler, a hue of each pixel in individual situations may be reflected in detail through the hue correcting AI upscaler through an algorithm and CNN learning, like the AI upscaled image 320. However, when a RGB image with the same two hue channels is input as an input image to the hue correcting AI upscaler, the two hue channels identified as having the same value may have the same value in the hue-corrected AI upscaled image 330. The same value of two hue channels, identified in an input image may be equal to or different from the same value of two hue channels, identified in an output image.

In one or more embodiments, G and B channels of a pixel 332 in the hue-corrected AI upscaled image 330 may have the same value of 63, and an R channel of the pixel 332 may have a value of 254 that is different from that of the G and B channels. The G and B channels of the pixel 312 in the upscaled image 310 may have a value of 96, and the R channel may have a value of 255. It may be confirmed that the G and B channels of the pixel 312 in the upscaled image 310 have the same value of 96, and the G and B channels of the pixel 332 in the hue-corrected AI upscaled image 330, located at a position corresponding to the pixel 312 in the upscaled image 310 also have the same value of 63. For example, it may be confirmed that the upscaled image 310 maintains hue quality even after being subject to the network of the hue correcting AI upscaler.

In one or more embodiments, that hue quality is maintained does may not indicate that hue channel values are the same, but may indicate that hue channel values are maintained linearly to satisfy the following Equation 1.

$$(R', G', B') = a \times (R, G, B) + b \qquad \text{[Equation 1]}$$

In one or more embodiments, the G and B channels of the pixel 312 in the upscaled image 310 may have the same identified value of 96, and the G and B channels of the pixel 332 in the hue corrected AI upscaled image 330 may have the same identified value of 63. For example, because values of hue channels are maintained linearly to satisfy the above equation, it may be confirmed that hue quality is maintained. The above example relates to an image having a RGB color space. However, embodiments are not limited thereto, and, for example, the above example may also be applied in the same way to a YCoCg image.

In one or more embodiments, by using the hue correcting AI scaler, a distortion of a hue of an output image from a hue of an input image may be reduced or minimized, and an output image with constant hue quality may be generated.

Figure 4:
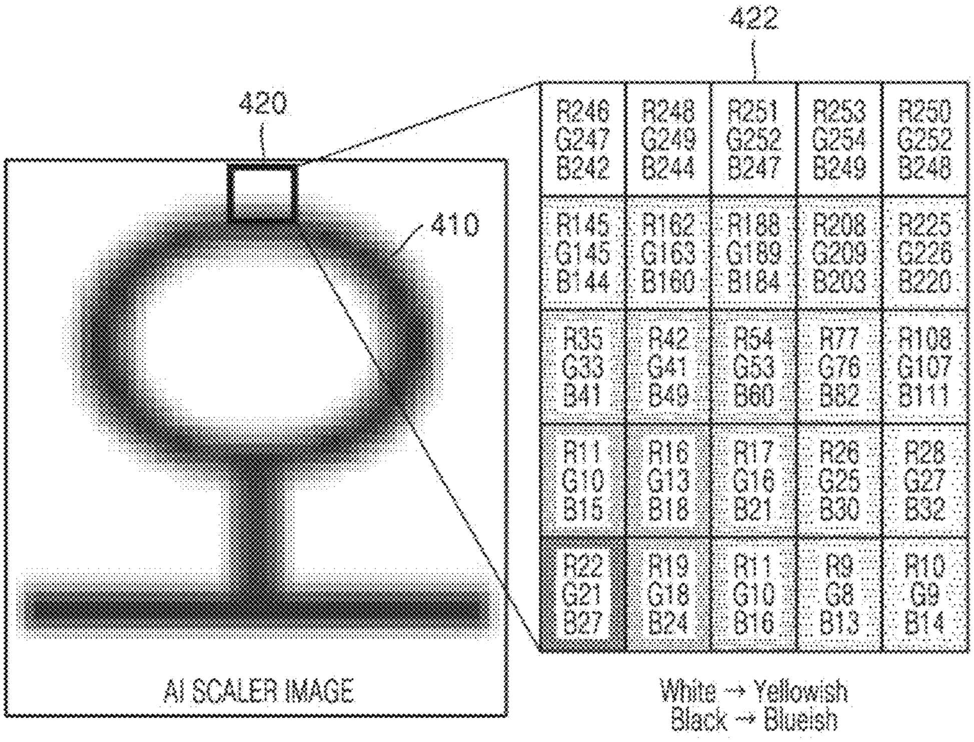
FIG. 4 shows results of scaling through an AI scaler, according to one or more embodiments.

FIG. 4 shows results of scaling through an AI scaler according to one or more embodiments.

In one or more embodiments, a black character image may be considered as a gray-scale image. Accordingly, all of R, G, and B channels as hue channels of an image having a RGB color space may have the same value.

In one or more embodiments, the existing AI upscaler may generate an AI upscaled image 410 by receiving the black character image as an input image and upscaling the input image.

In one or more embodiments, it may be confirmed that a hue of a pixel group 420 which is a part of the AI upscaled image 410 has been distorted or changed from a hue of the input image. As shown in an enlarged pixel group 422 of the pixel group 420, as R, G, and B channels of the input image have greater values (closer to a white color), the hue of the pixel group 420 has been distorted or changed to a yellow color, and, as the R, G, and B values of the input image have smaller values (closer to a black color), the hue of the pixel group 420 has been distorted or changed to a blue color.

The above example relates to an image having a RGB color space. However, embodiments are not limited thereto, and for example, the above example may also be applied in the same way to a YCoCg image.

Figure 5:
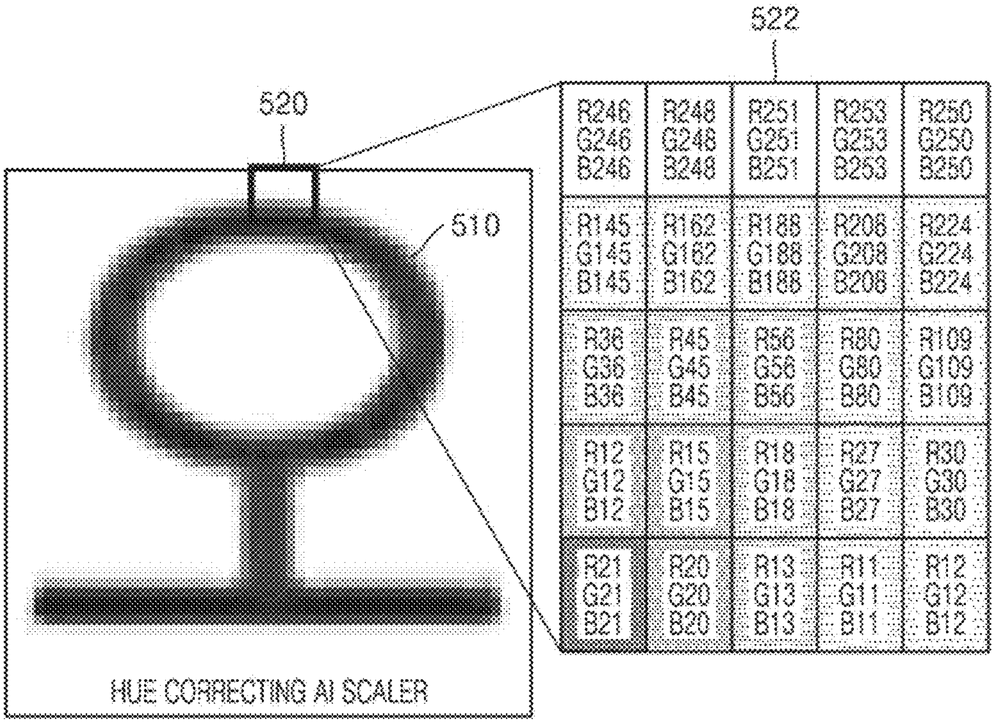
FIG. 5 shows results of scaling through a hue correcting AI scaler, according to one or more embodiments.

FIG. 5 shows results of scaling through a hue correcting AI scaler according to one or more embodiments.

In one or more embodiments, the hue correcting AI upscaler may generate a hue-corrected AI upscaled image 510 by receiving a black character image as an input image and upscaling the input image.

In one or more embodiments, it may be confirmed that a hue of a pixel group 520 which is a part of the hue-corrected AI upscaled image 510 has not been distorted or changed from a hue of the input image. As shown in an enlarged pixel group 522 of the pixel group 520, by reducing a distortion or change in hue of an output image from a hue of an input image through the hue correcting AI scaler, a hue-corrected image may be obtained or generated. Accordingly, it may be confirmed that the distortion or change of the hue of the pixel group 420 to the yellow or blue color, occurred in the AI upscaled image 410, has not occurred in the hue-corrected AI upscaled image 510. For example, it may be confirmed that R, G, and B channels have the same value.

The above example relates to an image having a RGB color space. However, embodiments are not limited thereto, and for example, the above example may also be applied in the same way to a YCoCg image.

Figure 6:
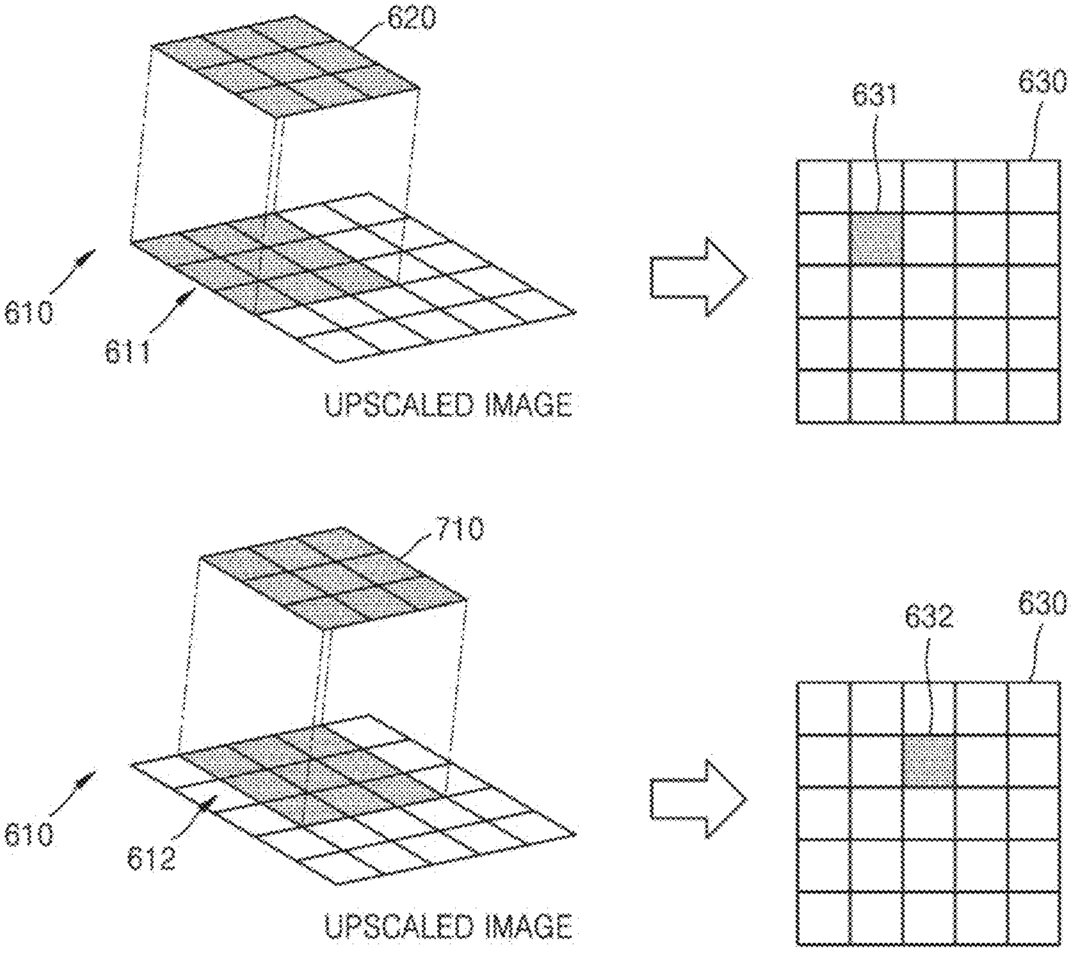
FIG. 6 is a reference view for describing a convolution operation that is performed in a convolutional neural network or a convolutional layer, according to one or more embodiments.

FIG. 6 is a reference view for describing a convolution operation that is performed in a convolutional neural network or a convolutional layer, according to one or more embodiments.

According to one or more embodiments, a reference drawing for describing a process of generating an output image through a convolution operation between an upscaled image 610 generated by upscaling an input image and a kernel 620 is provided. For convenience of description, it is assumed that the upscaled image 610 has a 5×5 size and the number of channels is 1. Also, it is assumed that the kernel applied to the upscaled image 610 has a 3×3 size and the number of channels is 1. Meanwhile, for convenience of explanation, it may be expressed as one kernel, but there can be more than one kernel depending on one or more convolutional layers of the convolution neural network.

In one or more embodiments, a convolution operation may be performed by applying the kernel from a left upper end to a right lower end of the upscaled image 610. In one or more embodiments, the electronic device may generate a pixel value 631 mapped to the 3×3 area 611 of the left upper end by multiplying pixel values included in a 3×3 area 611 of the left upper end by parameter values included in the kernel 620 and summing the results.

In one or more embodiments, the electronic device may generate a pixel value 632 mapped to the 3×3 area 612 by multiplying pixel values included in a 3×3 area 612 moved by one pixel from the 3×3 area 611 of the left upper end of the upscaled image 610 by the parameter values included in the kernel 620 and summing the results. In the same way, by multiplying pixel values of the upscaled image 610 by the parameter values included in the kernel 620 and summing the results while sliding the kernel 620 by one pixel from left to right and from top to bottom within the upscaled image 610, pixel values of a feature map 630 may be generated.

In one or more embodiments, data that is subject to a convolution operation may be sampled while moving by one pixel or by the number of two or more pixels. An interval of pixels sampled in a sampling process is referred to as a stride, and a size of the feature map 630 to be output may be determined according to a stride size. Also, as shown in FIG. 6, padding may be performed to cause the size of the feature map 630 to be identical to a size of the upscaled image 610. The padding means increasing a size of the upscaled image 610 by assigning a specific value (for example, '0') to edges to the upscaled image 610, in order to prevent the size of the feature map 630 from decreasing. By performing a convolution operation after performing padding, the size of the feature map 30 may become equal to the size of the upscaled image 610, although not limited thereto.

In one or more embodiments, only a result (e.g., the feature map 630) of a convolution operation on the kernel 620 is shown. However, in the case in which a convolution operation is performed on a plurality of kernels, feature maps including a plurality of channel images may be output. For example, the number of channels of the feature map 630 may be determined according to the number of kernels included in a kernel group.

In one or more embodiments, a convolutional neural network may include one or more convolution layers. In each of the convolutional layers, a convolution operation on one or more images (or feature maps) input to the convolutional layer with a kernel may be performed, and as a result of the convolution operation, one or more images (or feature maps) generated may be output. Also, one or more feature maps output from a current convolutional layer may be input to a next convolutional layer.

Figure 7:
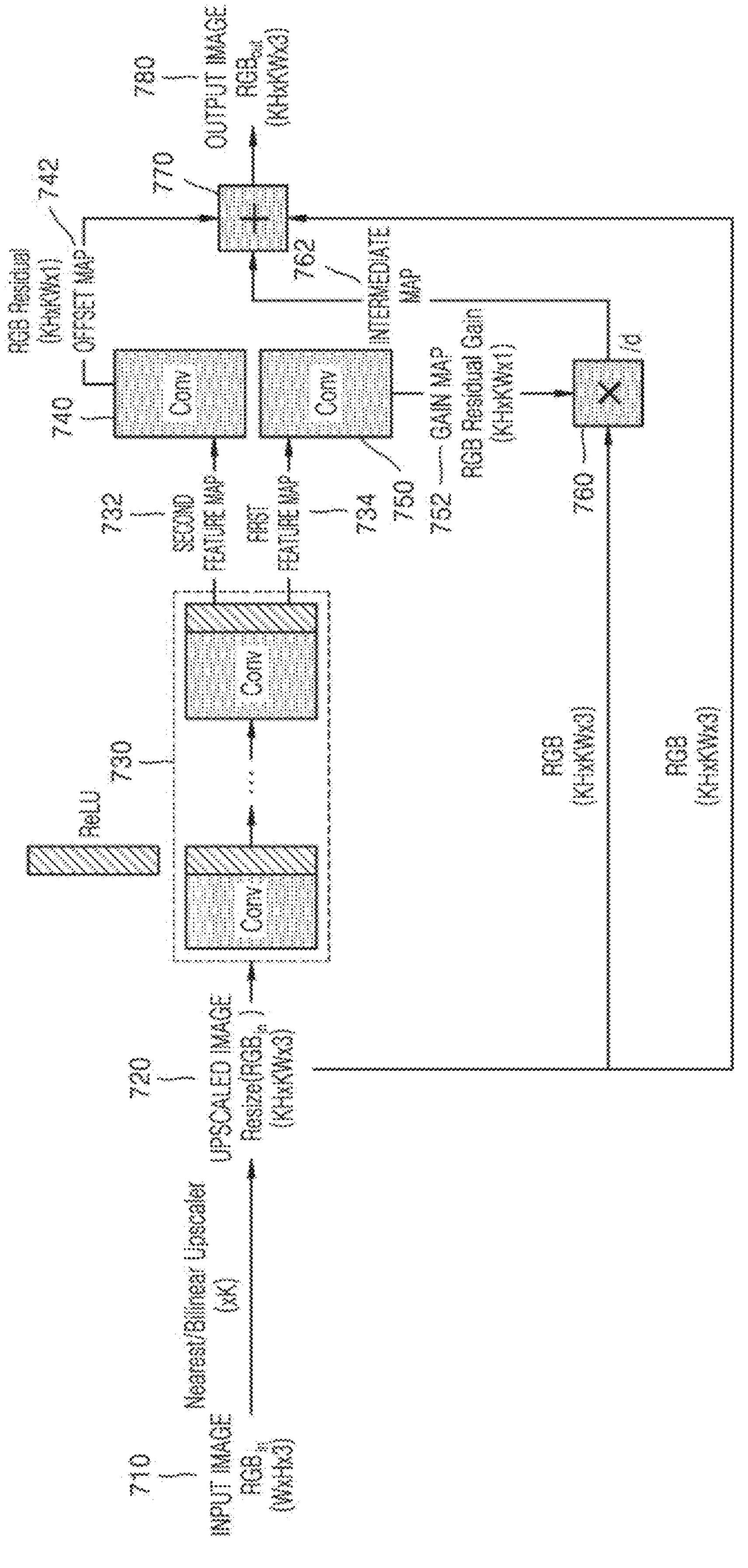
FIG. 7 shows a model of a hue correcting AI scaler that receives an image having a RGB color space as an input, according to one or more embodiments.

FIG. 7 shows a model of a hue correcting AI scaler with respect to an image having a RGB color space, according to one or more embodiments.

In one or more embodiments, an input image 710 may be input to the hue correcting AI scaler. The input image may be a RGB image. Also, a size of the input image may be expressed as a W×H×3, wherein a number 3 means the number of hue channels.

In one or more embodiments, by upscaling the input image, an upscaled image 720 may be generated. When the input image is upscaled K times, a size of the upscaled image 720 may be expressed as KW×KH×3.

In one or more embodiments, upscaling may refer to a method of raising resolution by inserting new pixels between pixels of an image. To generate the upscaled image 720 according to one or more embodiments, the input image 710 may be upscaled through an upscaling algorithm to generate the upscaled image 720. The upscaling algorithm may include at least one of a Nearest neighbor, Bilinear, Bicubic, Lanczos, or spline algorithm, although not limited thereto.

In one or more embodiments, by inputting the upscaled image 720 to a convolutional neural network 730, a convolution operation on the upscaled image 720 with one or more kernels included in the convolutional neural network 730 may be performed. A method of performing a convolution operation will be understood by referring to FIG. 6. The convolutional neural network 730 may include a plurality of convolutional layers and a plurality of activation layers, and the activation layers may be positioned after the convolutional layers.

According to one or more embodiments, in the activation layers, an activation function operation of applying an activation function to values input to the activation layers may be performed. The activation function operation may be to apply non-linear characteristics to feature information, and the activation function may include a sigmoid function, a Tanh function, a Rectified Linear Unit (ReLU) function, a leaky ReLu function, etc., although not limited thereto.

In one or more embodiments, by passing through one or more convolutional layers and one or more activation layers included in the convolutional neural network 730, a feature map may be obtained. The feature map may be one or more. By inputting the upscaled image 720 to the convolutional neural network 730, a first feature map 734 and a second feature map 732 may be obtained. For example, the first feature map 734 may be a part of an output obtained by inputting the upscaled image 720 to the convolutional neural network 730 and performing a convolution operation with one or more kernels, and the second feature map 732 may be a remaining part excluding the first feature map 734 from an output obtained by inputting the upscaled image 720 to the convolutional neural network 730 and performing a convolution operation with one or more kernels. The one or more kernels used to output the first feature map 734 may be different from the one or more kernels used to output the second feature map 732.

In one or more embodiments, the first feature map 734 may be input to a first convolutional layer 750, and the second feature map 732 may be input to a second convolutional layer 740. By inputting the first feature map to the first convolutional layer 750 and performing a convolution operation with one or more kernels included in the first convolutional layer 750, a gain map 752 may be obtained. Also, by inputting the second feature map 732 to the second convolutional layer 740 and performing a convolution operation with one or more kernels included in the second convolutional layer 740, an offset map 742 may be obtained.

In one or more embodiments, a size of the gain map 752 may be expressed as KW×KH×1, and a size of the offset map 742 may be expressed as KW×KH×1.

In one or more embodiments, an output image 780 may be obtained based on the upscaled image 720, the gain map 752, and the offset map 742.

In one or more embodiments, by performing multiplication based on a plurality of hue channels of the upscaled image 720, the gain map 752, and a normalization constant, an intermediate map 762 may be obtained.

In one or more embodiments, element-wise multiplication may be performed on each of the plurality of individual hue channels of the upscaled image 720 and the gain map 752. The element-wise multiplication may be performed by multiplying a value of an R channel of the upscaled image 720 by a value of the gain map 720 located at the same position, a value of a G channel of the upscaled image 720 by a value of the gain map 752 located at the same position, and a value of a B channel of the upscaled image 720 by a value of the gain map 752 located at the same position. Also, the element-wise multiplication may be performed by an element-wise multiplication layer 760.

In one or more embodiments, while the element-wise multiplication is performed, an arbitrary scalar number d may be used for normalization of each element. By performing element-wise multiplication on each of the plurality of individual hue channels of the upscaled image 720 and the gain map 752 through the element-wise multiplication layer 760 and multiplying each element by a normalization constant 1/d, that is, dividing each element by d, the intermediate map 762 may be obtained.

In one or more embodiments, element-wise multiplication may be performed on an R channel of the upscaled image 720 and the gain map 752, and each element may be multiplied by the normalization constant 1/d, that is, divided by d. The same operation may also be performed on G and B channels of the upscaled image 720. Also, by performing the operation, the intermediate map 762 may be obtained.

In one or more embodiments, the output image 780 may be obtained based on each of the plurality of individual hue channels of the upscaled image 720 and the intermediate map 762. In one or more embodiments, the output image 780 may be obtained based on each of the plurality of individual hue channels of the upscaled image 720, the intermediate map 762, and the offset map 742.

In one or more embodiments, the output image 780 may be obtained by performing addition on each of the plurality of individual hue channels of the upscaled image 720, the intermediate map 762, and the offset map 742.

In one or more embodiments, element-wise addition may be performed on each of the plurality of individual hue channels of the upscaled image 720, the intermediate map 762, and the offset map 742. The element-wise addition may be, for example, adding a value of the R channel of the upscaled image 720 and values of the intermediate map 762 and the offset map 742 located at the same position. Also, the same operation may be performed on the G and B channels of the upscaled image 720. Also, the element-wise addition may be performed through an element-wise addition layer 770.

In one or more embodiments, by inputting the individual channels of the upscaled image 720, the intermediate map 762, and the offset map 742 to the element-wise addition layer 770 and performing element-wise addition, the output image 780 may be generated. A size of the output image 780 may be expressed as KH×KW×3.

In one or more embodiments, in regard to a RGB image, an operation on the hue correcting AI scaler may be expressed as follows.

In one or more embodiments, when the input image 710 is $RGB_{in}$, the output image 780 is $RGB_{out}$, the gain map 752 is $M_{Gain}$, the offset map 742 is $M_{offset}$, and upscaling is expressed as Resize, an operation of the hue correcting AI scaler in a RGB color space may be expressed as the following Equation 2.

$$RGB_{out} = \mathrm{Resize}(RGB_{in}) + M_{Gain} \cdot \frac{\mathrm{Resize}(RGB_{in})}{d} + M_{offset} \quad \text{[Equation 2]}$$

Here, d is a normalization constant.

A block diagram shown in FIG. 7 is a block diagram for one or more embodiments. Components of the block diagram may be integrated, another component may be added, or some thereof may be omitted according to specifications of the electronic device 100 actually implemented. For example, two or more components may be integrated into one component or a component may be subdivided into two or more components, as necessary. Also, a function performed in each block may be provided to describe embodiments, and a detailed operation or device thereof does not limit the scope of rights of the present disclosure.

Figure 8:
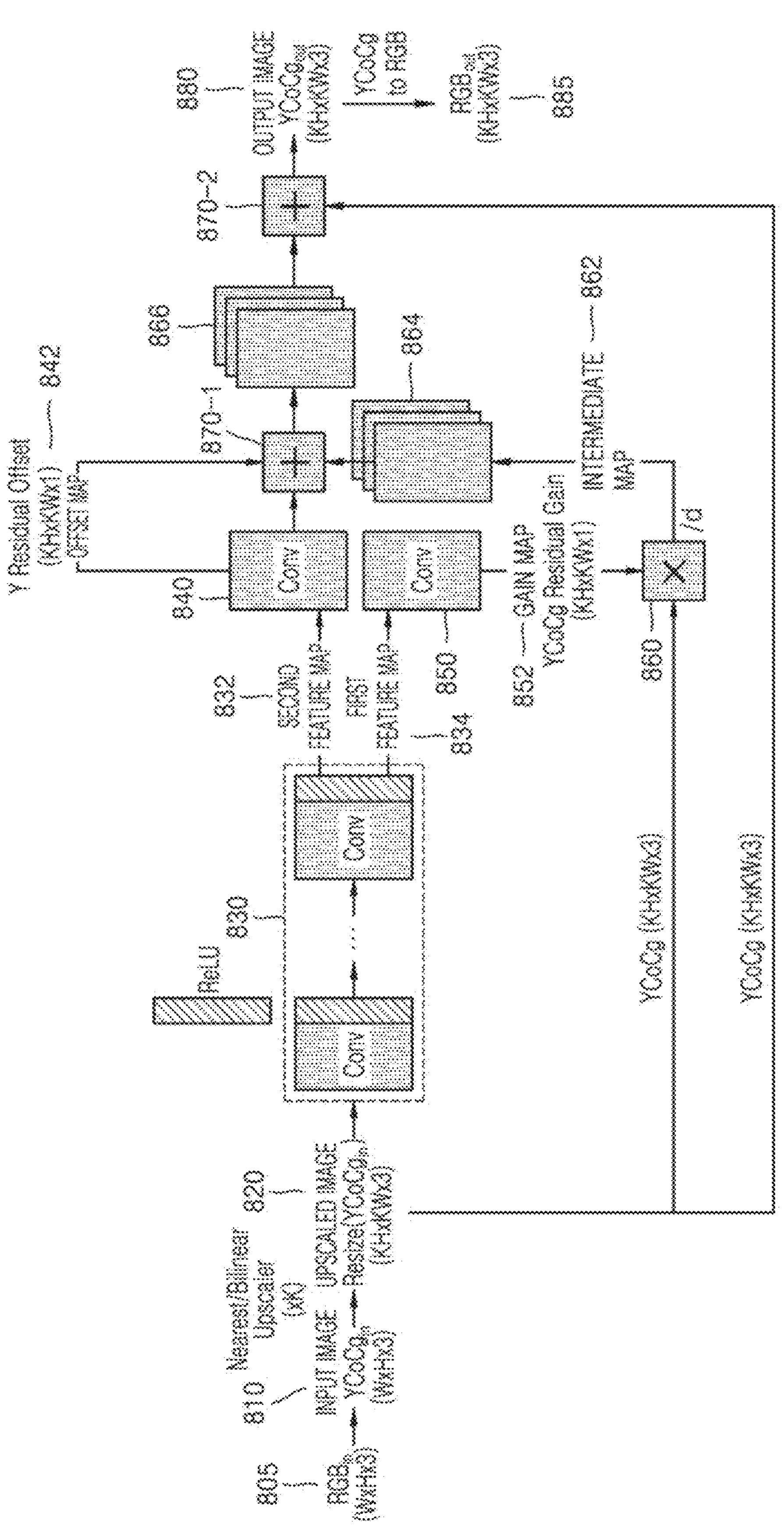
FIG. 8 shows a model of a hue correcting AI scaler that receives an image having a YCoCg color space as an input, according to one or more embodiments.

FIG. 8 shows a model of a hue correcting AI scaler in regard to an image having a YCoCg color space, according to one or more embodiments.

In one or more embodiments, according to reception of a RGB image 805 having a RGB color space, hue conversion into a YCoCg image having a YCoCg color space may be performed, and hue correcting AI scaling may be performed on the YCoCg image. The RGB image may be expressed by 8 bits of data, and the YCoCg image may be expressed by 9 or 10 bits of data. Accordingly, because the YCoCg image uses more bits for expression, a more delicate image quality processing may be possible. Also, in the case of inputting a YCoCg image to the hue correcting AI scaler model, hue correction performance of reducing a hue difference or distortion from an input image may be improved, compared to the case of inputting a RGB image to the hue correcting AI scaler model.

Equation for conversion into a YCoCg image may be shown in the following Equation 3.

$$\begin{bmatrix} Y \\ Cg \\ Co \end{bmatrix} = \begin{bmatrix} 1/4 & 1/2 & 1/4 \\ -1/4 & 1/2 & -1/4 \\ 1/2 & 0 & -1/2 \end{bmatrix} \cdot \begin{bmatrix} R \\ G \\ B \end{bmatrix} \quad \text{[Equation 3]}$$

In one or more embodiments, an input image 810 may be input to the hue correcting AI scaler. The input image may be a YCoCg image. Also, a size of the input image may be expressed as W×H×3, where a number 3 means the number of hue channels.

In one or more embodiments, by upscaling the input image, an upscaled image 820 may be generated. The input image may be upscaled K times, and a size of the upscaled image 820 may be expressed as KW×KH×3.

In one or more embodiments, to generate the upscaled image 820, the input image 810 may be upscaled through an upscaling algorithm to generate the upscaled image 820. The upscaling algorithm may include at least one of a Nearest neighbor, Bilinear, Bicubic, Lanczos, or spline algorithm, although not limited thereto.

In one or more embodiments, the upscaled image 820 may be input to a convolutional neural network 830 and a convolution operation on the upscaled image 820 with one or more kernels included in the convolutional neural network 830 may be performed. A method of performing a convolution operation will be understood by referring to FIG. 6. The convolutional neural network 830 may include a plurality of convolutional layers and a plurality of activation layers, and the activation layers may be positioned after the convolutional layers.

According to one or more embodiments, in the activation layers, an activation function operation of applying an activation function to values input to the activation layers may be performed. The activation function operation may be to apply non-linear characteristics to feature information, and the activation function may include a sigmoid function, a Tanh function, a Rectified Linear Unit (ReLU) function, a leaky ReLu function, etc., although not limited thereto.

In one or more embodiments, by passing through one or more convolutional layers and one or more activation layers included in the convolutional neural network 830, a feature map may be obtained. The feature map may be one or more. By inputting the upscaled image 820 to the convolutional neural network, a first feature map 834 and a second feature map 832 may be obtained. The first feature map 834 may be a part of an output obtained by inputting the upscaled image 820 to the convolutional neural network 830 and performing a convolution operation with one or more kernels, and the second feature map 832 may be a remaining part excluding the first feature map 834 from an output obtained by inputting the upscaled image 820 to the convolutional neural network 830 and performing a convolution operation with one or more kernels. The one or more kernels used to output the first feature map 834 may be different from the one or more kernels used to output the second feature map 832.

In one or more embodiments, the electronic device 100 may input the first feature map 834 to a first convolutional layer 850. Also, the electronic device 100 may input the second feature map 832 to a second convolutional layer 840. The electronic device 100 may obtain a gain map 852 by inputting the first feature map 834 to the first convolutional layer 850 and performing a convolution operation with one or more kernels included in the first convolutional layer 850. Also, the electronic device 100 may obtain an offset map 842 by inputting the second feature map 832 to the second convolutional layer 840 and performing a convolution operation with one or more kernels included in the second convolutional layer 840.

In one or more embodiments, a size of the gain map 852 may be expressed as KW×KH×1, and a size of the offset map 842 may be expressed as KW×KH×1.

In one or more embodiments, the electronic device 100 may obtain an output image 880 based on the upscaled image 820, the gain map 852, and the offset map 842.

In one or more embodiments, the electronic device 100 may obtain an intermediate map 862 by performing multiplication based on a plurality of hue channels of the upscaled image 820, the gain map 852, and the normalization constant.

In one or more embodiments, the electronic device 100 may perform element-wise multiplication on each of a plurality of individual hue channels of the upscaled image 820 and the gain map 852. The element-wise multiplication may be performed by multiplying a value of a Y channel of the upscaled image 820 by a value of the gain map 852 located at the same position, and multiplying a value of a Co or Cg channel of the upscaled image 820 by a value of the gain map 852 located at the same position. Also, the element-wise multiplication may be performed through an element-wise multiplication layer 860.

In one or more embodiments, the electronic device 100 may use an arbitrary scalar number d for normalization of each element, while performing the multiplication. The electronic device 100 may output an intermediate map 862 by performing element-wise multiplication on each of the plurality of individual hue channels of the upscaled image 820 and the gain map 752 through the element-wise multiplication layer 860, and multiplying each element by the normalization constant 1/d, that is, dividing each element by d.

In one or more embodiments, element-wise multiplication may be performed on a Y channel of the upscaled image 820 and the gain map 852, and each element may be multiplied by the normalization constant 1/d. The same operation may also be performed on Co and Cg channels of the upscaled image 820. Also, by performing the operation, the intermediate map 862 may be obtained.

In one or more embodiments, the electronic device 100 may obtain the output image 880 based on each of the plurality of individual hue channels of the upscaled image 820 and the intermediate map 862.

In one or more embodiments, the electronic device 100 may obtain the output image 880 based on each of the plurality of individual hue channels of the upscaled image 820, the intermediate map 862, and the offset map 842.

In one or more embodiments, the electronic device 100 may generate the output image 880 by performing addition on the Y channel of the plurality of hue channels of the upscaled image 820, the intermediate map 862, and the offset map 842. Also, the electronic device 100 may generate the output image 880 by performing addition on the Co or Cg channel of the plurality of hue channels of the upscaled image 820 and the intermediate map 862.

In one or more embodiments, the electronic device 100 may perform element-wise addition based on each of the plurality of hue channels of the upscaled image 820 and the intermediate map 862. The element-wise addition may be an operation of adding a value of the Y channel of the upscaled image 820 and values of the intermediate map 862 and the offset map 842 located at the same position. Also, the electronic device 100 may perform addition on a value of the Co or Cg channel of the upscaled image 820 and a value of the intermediate map 862 located at the same position. The element-wise addition may be performed through element-wise addition layers 870-1 and 870-2.

In one or more embodiments, the electronic device 100 may perform element-wise addition on the Y channel of the upscaled image 820, the intermediate map 862, and the offset map 842. The electronic device 100 may perform element-wise addition on the Co channel of the upscaled image 820 and the intermediate map 862. The electronic device 100 may perform element-wise addition on the Cg channel of the upscaled image 820 and the intermediate map 862. The electronic device 100 may generate the output image 880 by performing element-wise addition on each channel of a YCoCg image. A size of the output image 880 may be expressed as KH×KW×3.

In one or more embodiments, the electronic device 100 may not perform element-wise addition with an offset map with respect to Co and Cg channels among a plurality of hue channels of a YCoCg image. The intermediate map 862 may be a map 864 obtained by performing element-wise multiplication on the YCoCg channels and the gain map 852 and dividing all elements by a normalization function d, and may have a size of KW×KH×3. The electronic device 100 may input the offset map and a map including a feature of a Y channel and having a size of KW×KH×1 in the intermediate map to the element-wise addition layer 870-1. The electronic device 100 may input the upscaled image 820 and a map 866 output from the element-wise addition layer 870-1 to the element-wise addition layer 870-2. An image output from the element-wise addition layer 870-2 may be referred to as the output image 880.

In one or more embodiments, an operation on the hue correcting AI scaler with respect to a YCoCg image may be expressed as the following Equation 4 and Equation 5.

In one or more embodiments, when individual channels of the input image 810 are expressed as $Y_{in}$ and $CoCg_{in}$, individual channels of the output image 880 are expressed as $Y_{out}$ and $CoCg_{out}$, the gain map 852 is expressed as $M_{Gain}$, the offset map 842 is expressed as $M_{offset}$, and upscaling is expressed as Resize, an operation of the hue correcting AI scaler in a YCoCg color space may be expressed as follows, wherein d means a constant for normalization. Also, because the same operation is performed on Co and Cg channels of hue channels, the two channels may be combined and expressed.

$$Y_{out} = \text{Resize}(Y_{in}) + M_{Gain} \cdot \frac{\text{Resize}(Y_{in})}{d} + M_{offset} \quad \text{[Equation 4]}$$

$$CoCg_{out} = \text{Resize}(CoCg_{in}) + M_{Gain} \cdot \frac{\text{Resize}(CoCg_{in})}{d} \quad \text{[Equation 5]}$$

In one or more embodiments, an operation of color-converting the output image 880 as a YCoCg image into a RGB image 885 may be performed. Converting a YCoCg image into a RGB image may satisfy the following Equation 6.

$$\begin{bmatrix} R \\ G \\ B \end{bmatrix} = \begin{bmatrix} 1 & -1 & 1 \\ 1 & 1 & 0 \\ 1 & -1 & -1 \end{bmatrix} \cdot \begin{bmatrix} Y \\ Cg \\ Co \end{bmatrix} \quad \text{[Equation 6]}$$

Meanwhile, the block diagram shown in FIG. 8 is a block diagram for one or more embodiments. Components of the block diagram may be integrated, another component may be added, or some thereof may be omitted according to implementation of the electronic device 100. For example, two or more components may be integrated into one component or a component may be subdivided into two or more components, as necessary. Also, a function performed in each block may be provided to describe embodiments, and a detailed operation or device thereof does not limit the scope of rights of the present disclosure.

Figure 9:
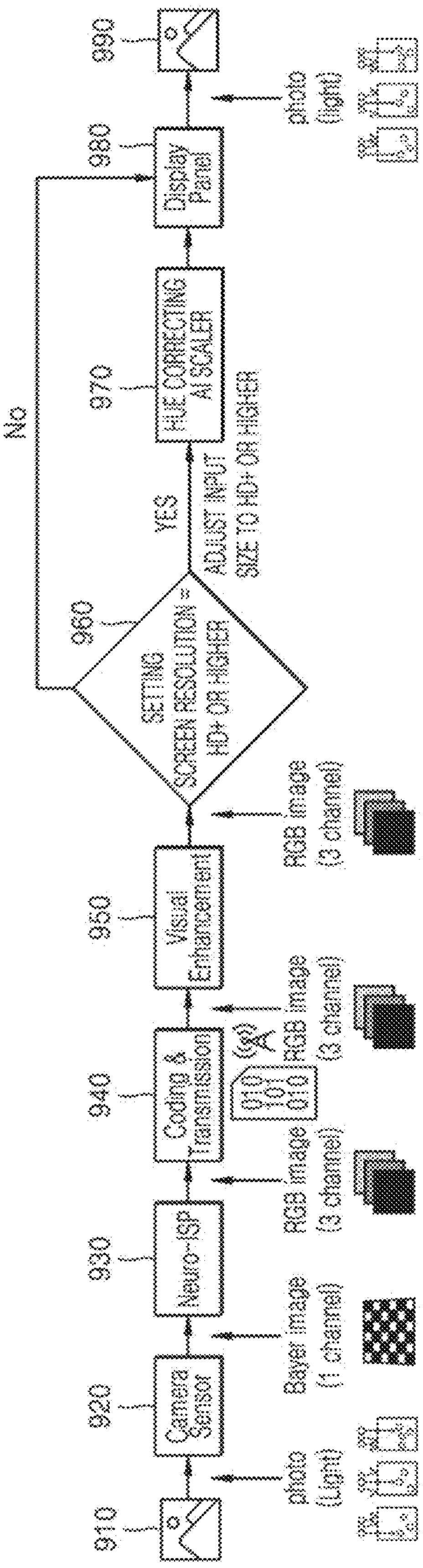
FIG. 9 shows a location at which a hue correcting AI scaler model is capable of being applied in an image quality pipeline, according to one or more embodiments.

FIG. 9 shows a location at which a hue correcting AI model is capable of being applied in an image quality pipeline, according to one or more embodiments.

In one or more embodiments, the electronic device 100 may obtain an image for an arbitrary scene. For example, the electronic device 100 may obtain an image of a scene 910 identified by an image sensor 920. The image sensor may include at least one of a Charge-Coupled Device (CCD) Sensor or a Complementary metal-oxide semiconductor (CMOS) Sensor.

In one or more embodiments, the image sensor 920 may obtain a Bayer image which is a 1-channel raw image by identifying photon information. A Neuro-Image Signal Processor (Neuro-ISP) 930 may convert the Bayer image into a RGB image.

In one or more embodiments, the electronic device 100 may perform coding and reception/transmission 940 on the RGB image. Also, a device which has received the RGB image may perform visual enhancement 950 which is image preprocessing for making the RGB image suitable for image analysis and image correction.

In one or more embodiments, the electronic device 100 may obtain an input 960 from a user to display an image having a resolution set by the user. The resolution set by the user may have an HD+, FHD+ or higher resolution. The electronic device 100 may generate an output image by upscaling, according to receiving an input command for displaying an image having an HD+ resolution from a user, an input image such that the input image has the resolution set by the user and performing hue correcting AI scaling 970 according to the present disclosure. Meanwhile, according to the resolution set by the user being higher than the resolution of the received RGB image, the hue correcting AI scaling 970 may be performed, and, according to the resolution set by the user being lower than or equal to the resolution of the received RGB image, the hue correcting AI scaling 970 may not be performed.

In one or more embodiments, the electronic device 100 may display the output image generated by the hue correcting AI scaler on a display 980 to provide the user with an image 990 of photon information.

The disclosure of FIG. 9 shows a representative method of obtaining, processing, or displaying an image through an image sensor. However, an image may be obtained by another method, instead of an image sensor. Also, all operations disclosed in FIG. 9 may not be necessarily performed, the operations may not be performed in the disclosed order, and some of the operations may be omitted. The above example relates to an image having a RGB color space. However, embodiments are not limited thereto, and for example, the above example may also be applied in the same way to a YCoCg image.

Figure 10:
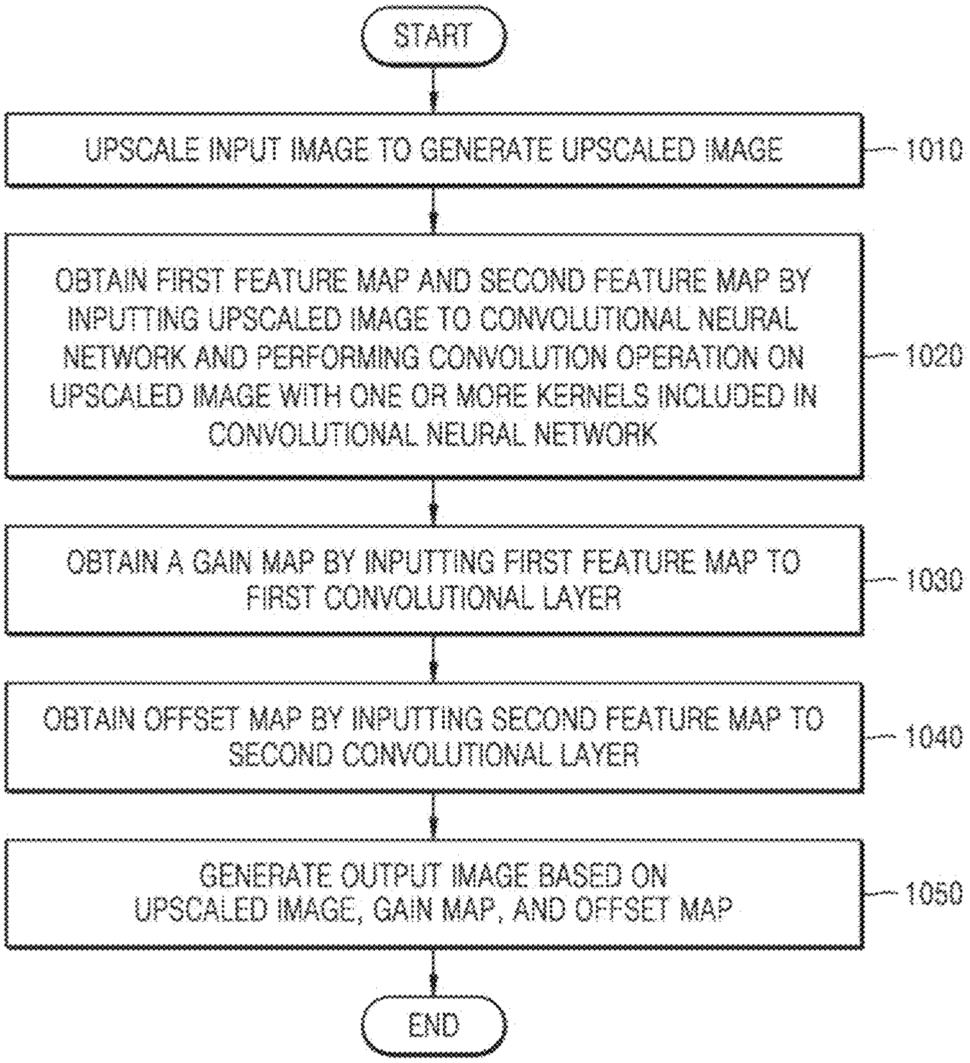
FIG. 10 is a view for describing an image processing method for correcting a hue, according to one or more embodiments.

FIG. 10 is a view for describing an image processing method for hue correction, according to one or more embodiments.

In operation S1010, the electronic device 100 may upscale an input image to generate an upscaled image.

In one or more embodiments, the electronic device 100 may generate the upscaled image by inputting the input image to the hue correcting AI scaler. The input image may be a RGB image or a YCoCg image. Upscaling may be performed by at least one algorithm method of Nearest neighbor, Bilinear, Bicubic, Lanczos, or spline.

In operation S1020, the electronic device 100 may obtain a first feature map and a second feature map by inputting the upscaled image to a convolutional neural network and performing a convolution operation on the upscaled image with one or more kernels included in the convolutional neural network.

In one or more embodiments, the electronic device 100 may input the upscaled image to the convolutional neural network. The convolutional neural network may include at least one convolutional layer and at least one activation layer.

In one or more embodiments, the convolutional neural network may obtain a feature map by receiving the upscaled image and performing a convolution operation with one or more kernels, wherein the feature map may be one or more.

In one or more embodiments, by inputting the upscaled image to the convolutional neural network, a first feature map and a second feature map may be obtained. The first feature map may be a part of an output obtained by inputting the upscaled image to the convolutional neural network and performing a convolution operation with one or more kernels, and the second feature map may be a remaining part excluding the first feature map from an output obtained by inputting the upscaled image to the convolutional neural network and performing a convolution operation with one or more kernels. The one or more kernels used to output the first feature map may be different from the one or more kernels used to output the second feature map.

In one or more embodiments, the convolutional neural network may be trained by using a training data set including input images and output images corresponding to the input images by the hue correcting AI scaler. Also, the convolutional neural network may be learned or trained to reduce a hue difference between an input image and an output image.

In one or more embodiments, each of the at least one convolutional layer included in the convolutional neural network may have a plurality of weight values, and perform a convolution operation through an operation between an operation result from the previous layer and the weight values. The plurality of weight values that the at least one convolutional layer has may be optimized by learning results. For example, the weight values may be updated such that a training loss value obtained during a training process is reduced or minimized.

In one or more embodiments, training loss used for training may include L1 loss or Structural Similarity Index Measure (SSIM) loss. The L1 loss may be training loss used to minimize a sum of absolute values of differences between pixel values of an input image and pixel values of an output image, and the SSIM loss may be training loss used to minimize differences of statistics for three element values of luminance, contrast, and structure between an input image and an output image. Because the hue correcting AI scaler includes a structure for hue correction, it may be unnecessary to independently define training loss for hue correction.

In operation S1030, the electronic device 100 may obtain a gain map by inputting the first feature map to a first convolutional layer.

In one or more embodiments, the electronic device 100 may input the obtained first feature map to the first convolutional layer. In one or more embodiments, the electronic device may obtain the gain map by performing a convolution operation on the first feature map with one or more kernels included in the first convolutional layer.

In one or more embodiments, the first convolutional layer may be trained by using a training data set including input images and output images corresponding to the input images by the hue correcting AI scaler. Also, the convolutional neural network may be learned or trained to reduce a hue difference between an input image and an output image. Training loss used for training may include L1 loss or SSIM loss.

In operation S1040, the electronic device 100 may obtain an offset map by inputting the second feature map to a second convolutional layer.

In one or more embodiments, the electronic device 100 may input the obtained second feature map to the second convolutional layer. By performing a convolution operation on the second feature map with one or more kernels included in the second convolutional layer, the offset map may be obtained.

In one or more embodiments, the second convolutional layer may be trained by using a training data set including input images and output images corresponding to the input images by the hue correcting AI scaler. Also, the convolutional neural network may be learned or trained to reduce a hue difference between an input image and an output image. Training loss used for training may include L1 loss or SSIM loss.

In operation S1050, the electronic device 100 may generate an output image based on the upscaled image, the gain map, and the offset map.

In one or more embodiments, the electronic device 100 may generate an output image of which a hue distortion or change has been reduced by using the upscaled image, the gain map, and the offset map.

In one or more embodiments, in the case in which the upscaled image is a RGB image, the electronic device may obtain an intermediate map by performing element-wise multiplication of multiplying a plurality of individual hue channels of the upscaled image by the gain map and dividing the results by a normalization constant. By performing element-wise addition of adding the plurality of individual hue channels of the upscaled image, the intermediate map, and the offset map, an output image may be generated. The element-wise multiplication and the element-wise addition may be performed through an element-wise multiplication layer and an element-wise addition layer.

In one or more embodiments, in the case in which the upscaled image is a YCoCg image, the electronic device 100 may obtain an intermediate map by performing element-wise multiplication of multiplying a plurality of individual hue channels of the upscaled image by the gain map and dividing the results by the normalization constant. Then, the electronic device 100 may perform element-wise addition of adding a Y channel of the upscaled image, the intermediate map, and the offset map. The electronic device 100 may perform element-wise addition by adding a Co channel of the upscaled image and the intermediate map. Also, the electronic device 100 may perform element-wise addition by adding a Cg channel of the upscaled image and the intermediate map. The electronic device 100 may generate an output image by performing element-wise addition on each channel of the upscaled image. The electronic device 100 may perform the element-wise multiplication and the element-wise addition by using an element-wise multiplication layer and an element-wise addition layer.

Figure 11:
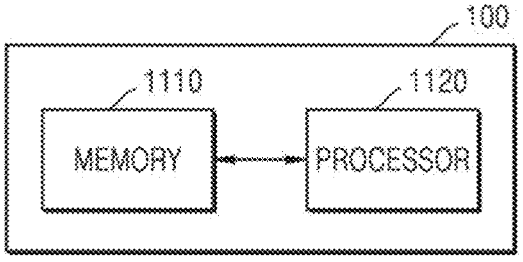
FIG. 11 is a block diagram showing a configuration of an electronic device according to one or more embodiments.

FIG. 11 is a block diagram showing a configuration of the electronic device 100 according to one or more embodiments.

According to one or more embodiments, the electronic device 100 may include a memory 1110 and a processor 1120.

In one or more embodiments, the processor 1120 may control overall operations of the electronic device 100. The processor 1120 according to one or more embodiments may execute one or more programs stored in the memory 1110.

In one or more embodiments, the memory 1110 may store various data, a program, or an application for driving and controlling the electronic device 100. The program stored in the memory 1110 may include one or more instructions. The program (one or more instructions) or application stored in the memory 1110 may be executed by the processor 1120. In one or more embodiments, the processor 1120 may include at least one of Central Processing Unit (CPU), Graphic Processing Unit (GPU), or Video Processing Unit (VPU). Alternatively, according to one or more embodiments, the processor 1120 may be implemented in the form of a System On Chip (SOC) into which at least one of CPU, GPU, or VPU is integrated. Alternatively, the processor 1120 may further include Neural Processing Unit (NPU).

In one or more embodiments, the processor 1120 may generate an output image of which a hue has been corrected to reduce a hue distortion or change, while upscaling an input image, by using the hue correcting AI scaler. For example, the processor 1120 may perform at least one of operations shown in FIGS. 6 to 8 and described.

In one or more embodiments, the processor 1120 may generate an upscaled image by inputting an input image to the hue correcting AI scaler. For example, the processor 1120 may perform upscaling by using at least one of a Nearest neighbor, Bilinear, Bicubic, Lanczos, or spline algorithm.

In one or more embodiments, the processor 1120 may obtain a first feature map and a second feature map by inputting the upscaled image to a convolutional neural network and performing a convolution operation on the upscaled image with one or more kernels included in the convolutional neural network. The convolutional neural network may include at least one convolutional layer and at least one activation layer.

In one or more embodiments, the processor 1120 may obtain the first feature map and the second feature map by inputting the upscaled image to the convolutional neural network. The first feature map may be a part of an output obtained by inputting the upscaled image to the convolutional neural network and performing a convolution operation with one or more kernels, and the second feature map may be a remaining part excluding the first feature map from an output obtained by inputting the upscaled image to the convolutional neural network and performing a convolution operation with one or more kernels. The one or more kernels used to output the first feature map may be different from the one or more kernels used to output the second feature map.

In one or more embodiments, the processor 1120 may train at least one of the convolutional neural network, the first convolutional layer, or the second convolutional layer by using a training data set including input images and output images corresponding to the input images by the hue correcting AI scaler. The at least one of the convolutional neural network, the first convolutional layer, or the second convolutional layer may be learned or trained to reduce hue differences between the input images and the output images. Training loss used for the training may include L1 loss or SSIM loss.

In one or more embodiments, the processor 1120 may input the obtained first feature map to the first convolutional layer and the obtained second map to the second convolutional layer. The processor 1120 may obtain a gain map by inputting the first feature map to the first convolutional layer and performing a convolutional layer of the first feature map with one or more kernels included in the first convolutional layer. The processor 1120 may obtain an offset map by inputting the second feature map to the second convolutional layer and performing a convolution operation on the second feature map with one or more kernels included in the second convolutional layer.

In one or more embodiments, the processor 1120 may obtain an output image of which a hue has been corrected to reduce a hue distortion, by using the upscaled image, the gain map, and the offset map. By performing element-wise multiplication of multiplying a plurality of individual hue channels of the upscaled image by the gain map and dividing the results by a normalization constant, an intermediate map may be obtained. In response to the upscaled image being a RGB image, the processor 1120 may obtain an output image by performing element-wise addition on the plurality of individual hue channels of the upscaled image, the intermediate map, and the offset map. In response to the upscaled image being a YCoCg image, the processor 1120 may obtain an output image by performing element-wise addition on a Y channel of the upscaled image, the intermediate map, and the offset map and performing element-wise addition on Co and Cg channels of the upscaled image and the intermediate map.

According to one or more embodiments, an image processing method may be provided. The method may upscale an input image 710 or 810 to generate an upscaled image 720 or 820. The method may obtain a first feature map 734 or 834 and a second feature map 732 or 832 by inputting the upscaled image 720 or 820 to a convolutional neural network 730 or 830 and performing a convolution operation on the upscaled image 720 or 820 with one or more kernels included in the convolutional neural network 730 or 830. The method may obtain a gain map 752 or 852 by inputting the first feature map 734 or 834 to a first convolutional layer 750 or 850. The method may obtain an offset map 742 or 842 by inputting the second feature map 732 or 832 to a second convolutional layer 740 or 840. The method may include an operation of generating an output image 780 or 880 based on the upscaled image 720 or 820, the gain map 752 or 852, and the offset map 742 or 842. The convolutional neural network 730 or 830 may be trained to reduce a hue difference between a hue of the input image and a hue of the output image.

According to one or more embodiments, the method may obtain an intermediate map 762 or 862 by performing element-wise multiplication based on a plurality of hue channels of the upscaled image 720 or 820, the gain map 752 or 852, and a normalization constant. The method may generate the output image 780 or 880 by performing element-wise addition on the plurality of hue channels of the upscaled image 720 or 820 and the intermediate map 762 or 862.

According to one or more embodiments, at least one of the convolutional neural network 730 or 830, the first convolutional layer 750 or 850, or the second convolutional layer 740 or 840 may be trained by using a training data set including input images and output images corresponding to the input images. The output images may be images obtained by correcting hues of upscaled images to reduce a hue distortion from the input images.

According to one or more embodiments, the training may be performed by using training loss, and the training loss may include at least one of L1 loss or SSIM loss.

According to one or more embodiments, the input image 710 or 810 and the output image 780 or 880 may be gray-scale images.

According to one or more embodiments, the input image 710 or 810 and the output image 780 or 880 may have a RGB color space or a YCoCg color space.

According to one or more embodiments, two or more hue channels among a plurality of hue channels of the input image 710 or 810 may have the same value. Two or more hue channels of the output image 780 or 880, corresponding to the two or more hue channels having the same value, may have the same value.

According to one or more embodiments, the method may obtain an image having a YCoCg color space by performing color space conversion on an image having a RGB color space. According to one or more embodiments, the method may obtain an image having a RGB color space by performing color space conversion on the generated output image. The input image 810 may be an image having the obtained YCoCg color space, and the output image 880 may be an image having a YCoCg color space.

According to one or more embodiments, the generating of the output image 780 or 880 by performing the element-wise addition may include generating, in response to the input image 710 and the output image 780 being images each having a RGB color space, the output image 780 by performing element-wise addition on the plurality of hue channels of the upscaled image 720, the intermediate map 762, and the offset map 742. The generating of the output image 780 or 880 by performing the element-wise addition may include generating, in response to the input image and the output image being images each having a YCoCg color space, the output image 880 by performing element-wise addition on a Y channel of the upscaled image 820, the intermediate map 862, and the offset map 842.

According to one or more embodiments, the method may obtain a user's input for displaying an image having a resolution set by the user. The generating of the upscaled image 720 or 820 may include upscaling the input image 710 or 810 to have the resolution set by the user. The resolution set by the user may be an HD+ or higher resolution.

According to one or more embodiments, an electronic device 100 for processing an image may include a memory 1110 storing one or more instructions, and at least one processor 1120 configured to execute the one or more instructions stored in the memory. The at least one processor 1120 may generate an upscaled image 720 or 820 by upscaling an input image 710 or 810. The at least one processor 1120 may obtain a first feature map 734 or 834 and a second feature map 732 or 832 by inputting the upscaled image 720 or 820 to a convolutional neural network 730 or 830 and performing a convolution operation on the upscaled image 720 or 820 with one or more kernels included in the convolutional neural network 730 or 830. The at least one processor 1120 may obtain a gain map 752 or 852 by inputting the first feature map 734 or 834 to a first convolutional layer 750 or 850. The at least one processor 1120 may obtain an offset map 742 or 842 by inputting the second feature map 732 or 832 to a second convolutional layer 740 or 840. The at least one processor 1120 may generate an output image 780 or 880 based on the upscaled image 720 or 820, the gain map 752 or 852, and the offset map 742 or 842. The convolutional neural network 730 or 830 may be trained to reduce a hue difference between the input image and the output image.

According to one or more embodiments, the at least one processor 1120 may obtain an intermediate map 762 or 862 by performing element-wise multiplication based on a plurality of hue channels of the upscaled image 720 or 820, the gain map 752 or 852, and a normalization constant. The at least one processor 1120 may generate the output image 780 or 880 by performing element-wise addition on the plurality of hue channels of the upscaled image 720 or 820 and the intermediate map 762 or 862.

According to one or more embodiments, at least one of the convolutional neural network 730 or 830, the first convolutional layer 750 or 850, or the second convolutional layer 740 or 840 may be trained by using a training data set including input images and output images corresponding to the input images. The output images may be are images obtained by correcting hues of upscaled images to reduce a hue distortion from the input images.

According to an embodiment, the training may be performed by using training loss, and the training loss may include at least one of L1 loss or SSIM loss.

According to one or more embodiments, the input image 710 or 810 and the output image 780 or 880 may be gray-scale images.

According to one or more embodiments, the input image 710 or 810 and the output image 780 or 880 may have a RGB color space or a YCoCg color space.

According to one or more embodiments, two or more hue channels among a plurality of hue channels of the input image 710 or 810 may have the same value, and two or more hue channels of the output image 780 or 880, corresponding to the two or more hue channels having the same value, may have the same value.

According to one or more embodiments, the at least one processor 1120 may obtain an image having a YCoCg color space by performing color space conversion on an image having a RGB color space. The at least one processor may obtain an image having a RGB color space by performing color space conversion on the generated output image. The input image 810 may be an image having the obtained YCoCg color space. The output image 880 may be an image having a YCoCg color space.

According to one or more embodiments, the at least one processor 1120 may generate, in response to the input image 710 and the output image 780 being images each having a RGB color space, the output image 780 by performing element-wise addition on the plurality of hue channels of the upscaled image 720, the intermediate map 762, and the offset map 742. The at least one processor 1120 may generate, in response to the input image and the output image being images each having a YCoCg color space, the output image 880 by performing element-wise addition on a Y channel of the upscaled image 820, the intermediate map 862, and the offset map 842.

According to one or more embodiments, a computer-readable recording medium storing a program for executing the method on a computer may be provided. The recording medium may be provided to be computer-readable to execute, on the computer, the generating of the upscaled image by upscaling the input image. The recording medium may be provided to be computer-readable to execute, on the computer, the obtaining of the first feature map and the second feature map by inputting the upscaled image to the convolutional neural network and performing the convolution operation on the upscaled image with the one or more kernels included in the convolutional neural network. The recording medium may be provided to be computer-readable to execute, on the computer, the obtaining of the gain map by inputting the first feature map to the first convolutional layer. The recording medium may be provided to be computer-readable to execute, on the computer, the obtaining of the offset map by inputting the second feature map to the second convolutional layer. The recording medium may be provided to be computer-readable to execute, on the computer, the generating of the output image based on the upscaled image, the gain map, and the offset map. The convolutional neural network may be trained to reduce a hue difference between the input image and the output image.

The method according to the present disclosure may be executed by a processor, application specific integrated circuit (ASIC), field programmable gate array (FPGA), or system-on-chip (SOC). Also, the described method may be executed by a storage medium that stores a computer-executable instruction and may execute the method according to the present disclosure when executed by the processor 130 on a computer.

A machine-readable storage medium may be provided in the form of a non-transitory storage medium, wherein the term 'non-transitory storage medium' simply means that the storage medium is a tangible device, and does not include a signal (e.g., an electromagnetic wave), but this term does not differentiate between where data is semi-permanently stored in the storage medium and where the data is temporarily stored in the storage medium. For example, a 'non-transitory storage medium' may include a buffer in which data is temporarily stored.

The method may be implemented in the form of a program command executable by various computer devices and recorded in a computer-readable medium. The computer-readable medium may include program commands, data files, data structures, or the like alone or in combination. The program commands recorded on the medium may be specially designed and configured for the present disclosure, or may be known and usable by those skilled in computer software. Examples of the computer-readable recording medium include a magnetic medium such as a hard disk, a floppy disk and a magnetic tape, an optical medium such as CD-ROM and DVD, a magneto-optical medium such as a floptical disk, and a hardware device specifically configured to store and execute program commands, such as ROM, RAM, and flash memory. Examples of the program commands include not only machine language codes produced by a compiler, but also high-level language codes that may be executed by a computer using an interpreter or the like.

Also, the image processing device and the method of operating the image processing device according to the disclosed embodiments may be included in a computer program product and provided. The computer program product may be traded between a seller and a purchaser as a commodity.

The computer program product may include a S/W program and computer-readable storage media in which the S/W program is stored. For example, the computer program product may include a product in the form of a S/W program (e.g., a downloadable app) that is electronically distributed through a manufacturer of an electronic device or an electronic marketplace. For electronic distribution, at least a part of the S/W program may be stored on storage media or may be created temporarily. In this case, the storage media may be storage media of a server of a manufacturer, a server of an electronic marketplace, or a relay server for temporarily storing the SW program.

The computer program product may include, in a system configured with a server and a client device, storage media of the server or storage media of the client device. Alternatively, when there is a third device (e.g., a smart phone) communicatively connected to the server or the client device, the computer program product may include storage media of the third device. Alternatively, the computer program product may include a S/W program itself transmitted from the server to the client device or to the third device, or from the third device to the client device.

In this case, one of the server, the client device, and the third device may execute the computer program product to perform the method according to the disclosed embodiments. Alternatively, two or more of the server, the client device, and the third device may execute the computer program product to distribute and perform the method according to the disclosed embodiments.

For example, a server (e.g., a cloud server or an AI server, etc.) may execute a computer program product stored on the server to control a client device communicatively connected to the server to perform the method according to the disclosed embodiments.

While embodiments have been described with reference to the figures, it will be understood by those of ordinary skill in the art that various changes in form and details may be made therein without departing from the spirit and scope as defined by the following claims and their equivalents.

What is claimed is:

1. An image processing method comprising:

upscaling an input image to generate an upscaled image;

obtaining a first feature map and a second feature map by inputting the upscaled image to a convolutional neural network and performing a convolution operation on the upscaled image with one or more kernels included in the convolutional neural network;

obtaining a gain map by inputting the first feature map to a first convolutional layer;

obtaining an offset map by inputting the second feature map to a second convolutional layer; and generating an output image, based on the upscaled image, the gain map, and the offset map, wherein the convolutional neural network is configured to be trained to reduce a difference between a hue of the input image and a hue of the output image.

2. The method of claim 1, wherein the generating of the output image, based on the upscaled image, the gain map, and the offset map, comprises:

obtaining an intermediate map by performing element-wise multiplication based on a plurality of hue channels of the upscaled image, the gain map, and a normalization constant; and generating the output image by performing element-wise addition on the plurality of hue channels of the upscaled image and on the intermediate map.

3. The method of claim 2, wherein the generating of the output image by performing the element-wise addition comprises:

generating, based on the input image and the output image being images each having a RGB color space, the output image by performing element-wise addition on the plurality of hue channels of the upscaled image, the intermediate map, and the offset map; or generating, based on the input image and the output image being images each having a YCoCg color space, the output image by performing element-wise addition on a Y channel of the upscaled image, the intermediate map, and the offset map.

4. The method of claim 1, wherein at least one of the convolutional neural network, the first convolutional layer, or the second convolutional layer is configured to be trained based on a training data set comprising input images and output images corresponding to the input images, and wherein the output images are images obtained by correcting hues of upscaled images to reduce a hue distortion of the input images.

5. The method of claim 4, wherein the training is performed based on training loss, and wherein the training loss comprises at least one of L1 loss or SSIM loss.

6. The method of claim 1, wherein the input image and the output image are gray-scale images.

7. The method of claim 1, wherein the input image and the output image have a red-green-blue (RGB) color space or a YCoCg color space.

8. The method of claim 7, wherein two or more hue channels among a plurality of hue channels of the input image have the same value, and wherein two or more hue channels among a plurality of hue channels of the output image, corresponding to the two or more hue channels of the input image having the same value, have the same value.

9. The method of claim 1, further comprising:

obtaining an image having a YCoCg color space by performing color space conversion on an image having a RGB color space; and obtaining an image having a RGB color space by performing color space conversion on the generated output image, wherein the input image is an image having the obtained YCoCg color space, and wherein the output image is an image having a YCoCg color space.

10. The method of claim 1, further comprising:

obtaining a user input for displaying an image having a resolution set by the user, wherein the generating of the upscaled image further comprises upscaling the input image to have the resolution set by the user, and wherein the resolution set by the user is greater than or equal to an HD+ resolution.

11. An electronic device configured to process an image comprising:

a memory configured to store one or more instructions; and at least one processor configured to execute the one or more instructions stored in the memory to:

generate an upscaled image by upscaling an input image;

obtain a first feature map and a second feature map by inputting the upscaled image to a convolutional neural network and performing a convolution operation on the upscaled image with one or more kernels included in the convolutional neural network;

obtain a gain map by inputting the first feature map to a first convolutional layer;

obtain an offset map by inputting the second feature map to a second convolutional layer; and generate an output image, based on the upscaled image, the gain map, and the offset map, wherein the convolutional neural network is configured to be trained to reduce a difference between a hue of the input image and a hue of the output image.

12. The electronic device of claim 11, wherein the at least one processor is further configured to execute the one or more instructions to:

obtain an intermediate map by performing element-wise multiplication, based on a plurality of hue channels of the upscaled image, the gain map, and a normalization constant; and generate the output image by performing element-wise addition on the plurality of hue channels of the upscaled image and the intermediate map.

13. The electronic device of claim 11, wherein at least one of the convolutional neural network, the first convolutional layer, and the second convolutional layer is configured to be trained based on a training data set comprising input images, output images corresponding to the input images, and wherein the output images are images obtained by correcting hues of upscaled images to reduce a hue distortion from the input images.

14. The electronic device of claim 13, wherein the training is performed based on training loss, and wherein the training loss comprises at least one of L1 loss or SSIM loss.

15. A non-transitory computer-readable recording medium storing a program for executing a method on a computer, the method comprising:

upscaling an input image to generate an upscaled image;

obtaining a first feature map and a second feature map by inputting the upscaled image to a convolutional neural network and performing a convolution operation on the upscaled image with one or more kernels included in the convolutional neural network;

obtaining a gain map by inputting the first feature map to a first convolutional layer;

obtaining an offset map by inputting the second feature map to a second convolutional layer; and generating an output image, based on the upscaled image, the gain map, and the offset map, wherein the convolutional neural network is configured to be trained to reduce a difference between a hue of the input image and a hue of the output image.

16. The method of claim 15, wherein the generating of the output image, based on the upscaled image, the gain map, and the offset map, comprises:

obtaining an intermediate map by performing element-wise multiplication based on a plurality of hue channels of the upscaled image, the gain map, and a normalization constant; and generating the output image by performing element-wise addition on the plurality of hue channels of the upscaled image and on the intermediate map.

17. The method of claim 15, wherein at least one of the convolutional neural network, the first convolutional layer, or the second convolutional layer is configured to be trained based on a training data set comprising input images and output images corresponding to the input images, and wherein the output images are images obtained by correcting a hue of the upscaled image to reduce a hue distortion of the input images.

18. The method of claim 17, wherein the training is performed based on training loss, and wherein the training loss comprises at least one of L1 loss or SSIM loss.

19. The method of claim 15, wherein the input image and the output image are gray-scale images.

20. The method of claim 15, wherein the input image and the output image have a red-green-blue (RGB) color space or a YCoCg color space.

* * * * *